US011495187B2

(12) United States Patent
Harigai et al.

(10) Patent No.: US 11,495,187 B2
(45) Date of Patent: Nov. 8, 2022

(54) INFORMATION PROCESSING DEVICE AND NON-TRANSITORY COMPUTER READABLE MEDIUM

(71) Applicant: FUJIFILM Business Innovation Corp., Tokyo (JP)

(72) Inventors: Jungo Harigai, Kanagawa (JP); Yoshitaka Kuwada, Kanagawa (JP); Takashi Hiramatsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/225,142

(22) Filed: Apr. 8, 2021

(65) Prior Publication Data

US 2022/0059044 A1 Feb. 24, 2022

(30) Foreign Application Priority Data

Aug. 21, 2020 (JP) .............................. JP2020-140414

(51) Int. Cl.
*G09G 3/36* (2006.01)
*G01J 3/46* (2006.01)
*H04N 1/60* (2006.01)
*G09G 3/20* (2006.01)

(52) U.S. Cl.
CPC .............. *G09G 3/3607* (2013.01); *G01J 3/46* (2013.01); *G09G 3/2003* (2013.01); *H04N 1/6008* (2013.01); *H04N 1/6016* (2013.01)

(58) Field of Classification Search
CPC .. H04N 1/6008; H04N 1/6016; H04N 1/6033; G09G 3/2003; G09G 3/3607; G01J 3/46
See application file for complete search history.

(56) References Cited

FOREIGN PATENT DOCUMENTS

| JP | 2008154175 | * | 7/2008 |
| JP | 4881146 | | 2/2012 |
| JP | 2013187800 | | 9/2013 |

* cited by examiner

*Primary Examiner* — Kenneth Bukowski
(74) *Attorney, Agent, or Firm* — JCIPRNET

(57) ABSTRACT

An information processing device includes a processor configured to acquire image data including color information, acquire color information of a formed image, the formed image being an image formed on a recording medium on a basis of the image data, acquire light transmittance information expressing a degree of light transmittance of an image-carrying medium, the image-carrying medium being the recording medium on which the formed image is formed, and associate first color information, second color information, and the light transmittance information with each other, the first color information being the color information included in the image data and the second color information being the color information of the formed image.

18 Claims, 14 Drawing Sheets

FIG. 3

| C, M, Y, K, SPOT COLOR (ORIGINAL IMAGE DATA - FIRST COLOR INFORMATION) | R, G, B (SECOND COLOR INFORMATION), TRANSMITTANCE PARAMETER (Tr) | |
|---|---|---|
| 0,0,0,0,0 | ... | |
| 0,0,0,0,20 | ... | |
| 0,0,0,0,60 | ... | |
| 0,0,0,0,80 | ... | |
| 0,0,0,0,100 | ... | |
| ... | ... | |
| ... | ... | |
| 0,20,0,0,80 | 185,151,95 | 0.8 |
| ... | ... | |
| ... | ... | |

FIG. 6

| C, M, Y, K, SPOT COLOR (FIRST COLOR INFORMATION) | L, a, b (SECOND COLOR INFORMATION), TRANSMITTANCE PARAMETER (Tr) |
|---|---|
| 0,0,0,0,0 | ... |
| 0,0,0,0,20 | ... |
| 0,0,0,0,60 | ... |
| 0,0,0,0,80 | ... |
| 0,0,0,0,100 | ... |
| ... | ... |
| ... | ... |
| 0,20,0,0,80 | E, F, G   H |
| ... | ... |
| ... | ... |

6A    6B    6C

81

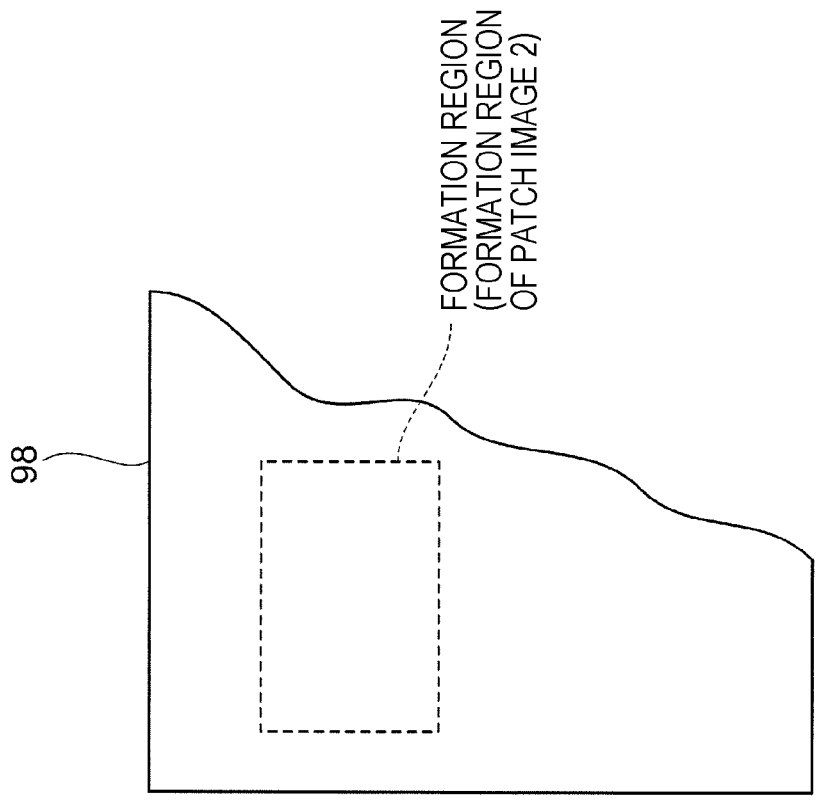
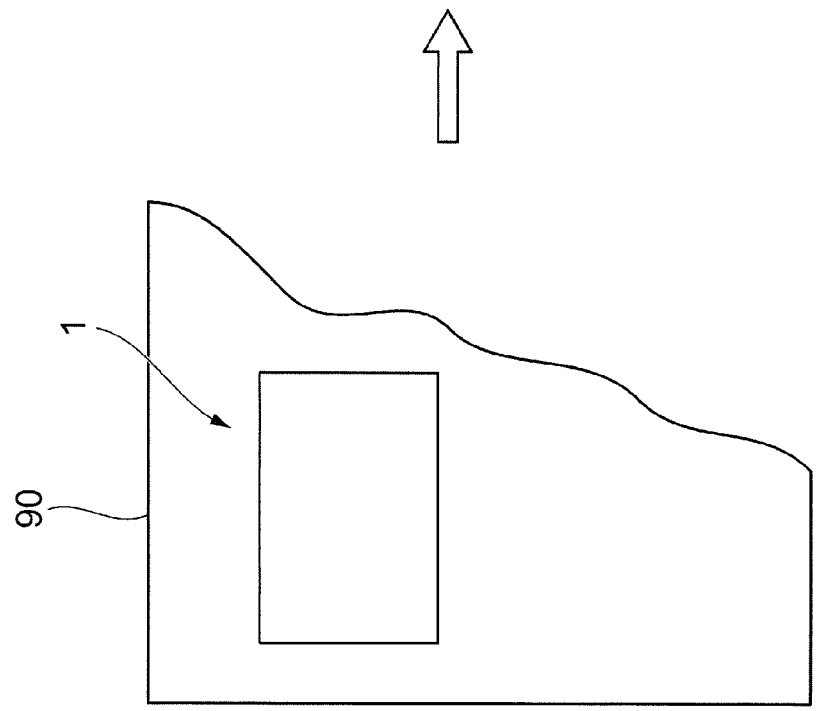

FIG. 11

| PIXEL POSITION INFORMATION (X,Y) | C, M, Y, K, SPOT COLOR (FIRST COLOR INFORMATION) | R, G, B (SECOND COLOR INFORMATION), TRANSMITTANCE PARAMETER (Tr) |
|---|---|---|
| ( 0000 , 0001 ) | 0,0,0,0,0 | ... |
| ( 0000 , 0001 ) | 0,0,0,0,20 | ... |
| ( 0000 , 0001 ) | 0,0,0,0,60 | ... |
| ( 0000 , 0001 ) | 0,0,0,0,80 | ... |
| ( 0000 , 0001 ) | 0,0,0,0,100 | ... |
| ... | ... | ... |
| ... | ... | ... |
| ( 0000 , 0001 ) | 0,20,0,0,80 | 185,151,95   0.8 |
| ... | ... | ... |
| ... | ... | ... |
| ( 0000 , 0002 ) | 0,0,0,0,0 | ... |
| ( 0000 , 0002 ) | 0,0,0,0,20 | ... |
| ( 0000 , 0002 ) | 0,0,0,0,60 | ... |
| ( 0000 , 0002 ) | 0,0,0,0,80 | ... |
| ( 0000 , 0002 ) | 0,0,0,0,100 | ... |
| ... | ... | ... |
| ... | ... | ... |
| ( 0000 , 0002 ) | 0,20,0,0,80 | 185,151,95   0.7 |
| ... | ... | ... |
| ... | ... | ... |
| ( 0000 , 0003 ) | 0,0,0,0,0 | ... |
| ( 0000 , 0003 ) | 0,0,0,0,20 | ... |
| ( 0000 , 0003 ) | 0,0,0,0,60 | ... |
| ( 0000 , 0003 ) | 0,0,0,0,80 | ... |
| ( 0000 , 0003 ) | 0,0,0,0,100 | ... |
| ... | ... | ... |
| ... | ... | ... |
| ( 0000 , 0003 ) | 0,20,0,0,80 | 185,151,95   0.8 |
| ... | ... | ... |
| ... | ... | ... |

11A points to the ( 0000 , 0002 ) / 0,20,0,0,80 / 185,151,95  0.7 row.

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-140414 filed Aug. 21, 2020.

BACKGROUND

(i) Technical Field

The present disclosure relates to an information processing device and a non-transitory computer readable medium.

(ii) Related Art

Japanese Patent No. 4881146 discloses an information processing device including a calculating means that calculates a colorimetry value of multiple patches from the spectral reflectance the spectral transmittance of the multiple patches and the spectral reflectance of a backing material, and a creating means that creates a color profile of an output device corresponding to the backing material from the calculated colorimetry values of the multiple patches.

SUMMARY

The translucency or sheerness of an image formed on a recording medium may be ascertained by actually forming the image on the recording medium. However, in cases where there are multiple types of image data, for example, forming an image on a recording medium for each type of image data is burdensome.

Aspects of non-limiting embodiments of the present disclosure relate to ascertaining the translucency or sheerness of an image formed on a recording medium without actually forming the image on the recording medium.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing device including a processor configured to acquire image data including color information, acquire color information of a formed image, the formed image being an image formed on a recording medium on a basis of the image data, acquire light transmittance information expressing a degree of light transmittance of an image-carrying medium, the image-carrying medium being the recording medium on which the formed image is formed, and associate first color information, second color information, and the light transmittance information with each other, the first color information being the color information included in the image data and the second color information being the color information of the formed image.

BRIEF DESCRIPTION OF THE DRAWINGS

An exemplary embodiment of the present disclosure will be described in detail based on the following figures, wherein:

FIG. 3 is a diagram illustrating a first conversion table;

FIG. 6 is a diagram illustrating a generated first conversion table;

FIGS. 10A and 10B are diagrams illustrating original image data and a formation sheet;

FIG. 11 is a diagram illustrating another example of the first conversion table;

DETAILED DESCRIPTION

Hereinafter, exemplary embodiments of the present disclosure will be described with reference to the drawings.

Figure 1:
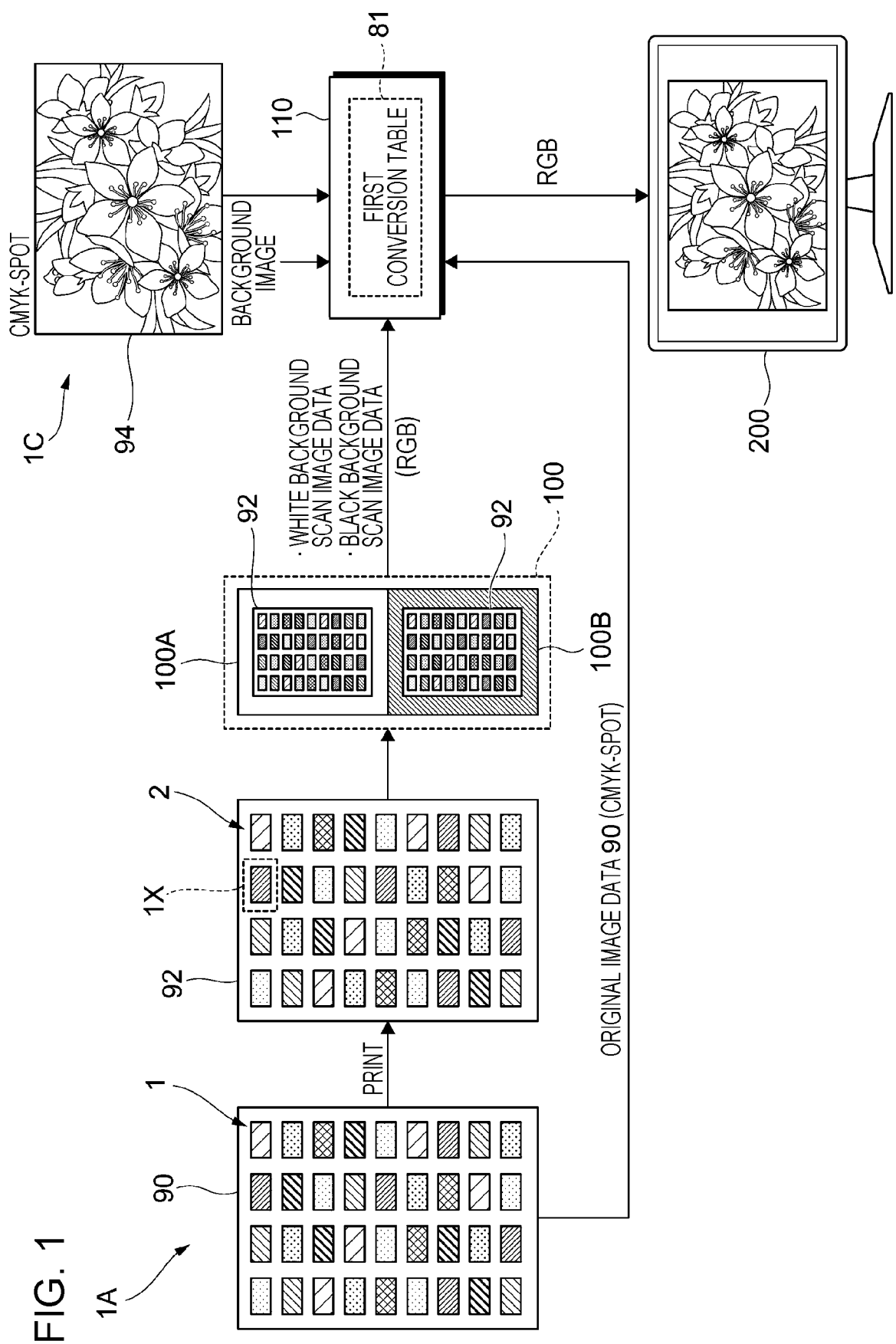
FIG. 1 is a diagram for explaining a flow of processes executed by an exemplary embodiment.

FIG. 1 is a diagram for explaining a flow of processes executed by an exemplary embodiment.

In the exemplary embodiment, image data 90 (hereinafter referred to as the "original image data 90") expressing an image containing multiple patch images 1 is prepared, as indicated by the sign 1A.

Specifically, in the exemplary embodiment, original image data 90 expressing an image containing multiple patch images 1 having mutually different component values of each of the spot colors cyan (C), magenta (M), yellow (Y), and black (K) is prepared. In other words, in the exemplary embodiment, original image data 90 containing color information about multiple colors is prepared.

The original image data 90 is generated according to user settings set with respect to a print settings screen opened on an operation screen of a computer device not illustrated, for example.

Next, in the exemplary embodiment, printing onto a sheet based on the original image data 90 is performed by a printing device (not illustrated), and a sheet 92 on which the multiple patch images 2 are formed (hereinafter, the "patch formation sheet 92") is generated.

In other words, in the exemplary embodiment, an image is formed on a sheet of paper as one example of a recording medium on the basis of the original image data 90, and the patch formation sheet 92 is generated as one example of an image-carrying medium.

Examples of the color material used to print onto a sheet include ink and toner. Ink or toner includes the four colors of cyan (C), magenta (M), yellow (Y), and black (K), as well as spot colors such as silver, gold, and clear, for example.

Note that the exemplary embodiment describes an example in which the target of printing based on the original image data 90 is a sheet of paper, but the target of printing is not limited to paper and may also be a material such as film, wood, or cloth.

Next, in the exemplary embodiment, the image on the patch formation sheet 92 is scanned by a scanner device 100 as one example of an image reading device. In other words, the scanner device 100 scans the formed image, that is, the image formed on the patch formation sheet 92.

Additionally, a conversion table 81 (hereinafter referred to as the "first conversion table 81") is generated on the basis of the scan image data obtained by scanning and the original image data 90.

More specifically, in the exemplary embodiment, scan image data (white background scan image data (details described later)) and the original image data 90 are input into an information processing device 110, and the first conversion table 81 is generated by the information processing device 110.

More specifically, in the exemplary embodiment, the first conversion table 81 for converting image data in a color space of CMYK and a spot color (hereinafter simply referred to as "CMYK-Spot") to image data in the RGB color space is generated.

Here, in the exemplary embodiment, the information processing device 110 is provided with a central processing unit (CPU) 111 (described later) as an example of a processor, and in the exemplary embodiment, various processes are executed by the CPU 111.

More specifically, in the exemplary embodiment, first, the information processing device 110 acquires original image data 90 in the CMYK-Spot color space and scan image data (white background scan image data) in the RGB color space obtained by scanning the patch formation sheet 92.

Thereafter, on the basis of the acquired original image data 90 in the CMYK-Spot color space and the scan image data in the RGB color space, the information processing device 110 generates the first conversion table 81 for converting image data in the CMYK-Spot color space to image data in the RGB color space.

In other words, the information processing device 110 generates the first conversion table 81 by associating color information included in the original image data 90 (hereinafter referred to as "first color information") with the color information of the formed image formed on the patch formation sheet 92 (hereinafter referred to as "second color information").

Specifically, in the exemplary embodiment, a white background plate 100A as one example of a first background and a black background plate 100B as one example of a second background are prepared in the scanner device 100.

More specifically, the plate-shaped white background plate 100A having a white surface installed behind the patch formation sheet 92 and the plate-shaped black background plate 100B having a black surface installed behind the patch formation sheet 92 are prepared in the scanner device 100.

In other words, the white background plate 100A and the black background plate 100B having a different lightness from the white background plate 100A are prepared in the scanner device 100.

Additionally, in the scanner device 100, the patch formation sheet 92 is scanned in the state with the white background plate 100A installed behind the patch formation sheet 92.

Thereafter, in the exemplary embodiment, the above first conversion table 81 is generated on the basis of the original image data 90 in the CMYK-Spot color space and the scan image data in the RGB color space obtained while the white background plate 100A is installed.

In other words, in the exemplary embodiment, the above first conversion table 81 is generated on the basis of the first color information included in the original image data 90 and the second color information obtained by scanning the 92 with the white background plate 100A installed.

Furthermore, in the exemplary embodiment, the patch formation sheet 92 is scanned in the state with the black background plate 100B installed. More specifically, the patch formation sheet 92 is scanned in the state with the black background plate 100B installed behind the patch formation sheet 92.

Additionally, in the exemplary embodiment, the information processing device 110 generates a transmittance parameter Tr (details described later) that indicates the degree of light transmittance on the basis of the above scan image data obtained while the white background plate 100A is installed (hereinafter referred to as the "white background scan image data") and the scan image data obtained while the black background plate 100B is installed (hereinafter referred to as the "black background scan image data").

In other words, in the exemplary embodiment, a first scan result obtained by scanning the formed image with the white background plate 100A installed behind the patch formation sheet 92 as one example of an image-carrying medium is acquired.

Also, in the exemplary embodiment, a second scan result obtained by scanning the formed image with the black background plate 100B installed behind the patch formation sheet 92 is acquired.

Additionally, in the exemplary embodiment, the information processing device 110 generates the transmittance parameter Tr as one example of light transmittance information on the basis of the first scan result and the second scan result.

More specifically, in the exemplary embodiment, the white background scan image data and the black background scan image data are sent to the information processing device 110, and the transmittance parameter Tr is generated on the basis of the two pieces of image data by the information processing device 110.

Here, the transmittance parameter Tr is a numerical value in the range from 0 to 1, for example, in which a larger numerical value indicates a higher transmittance of light.

Additionally, in the exemplary embodiment, the transmittance parameter Tr is registered in the first conversion table 81.

Figure 2:
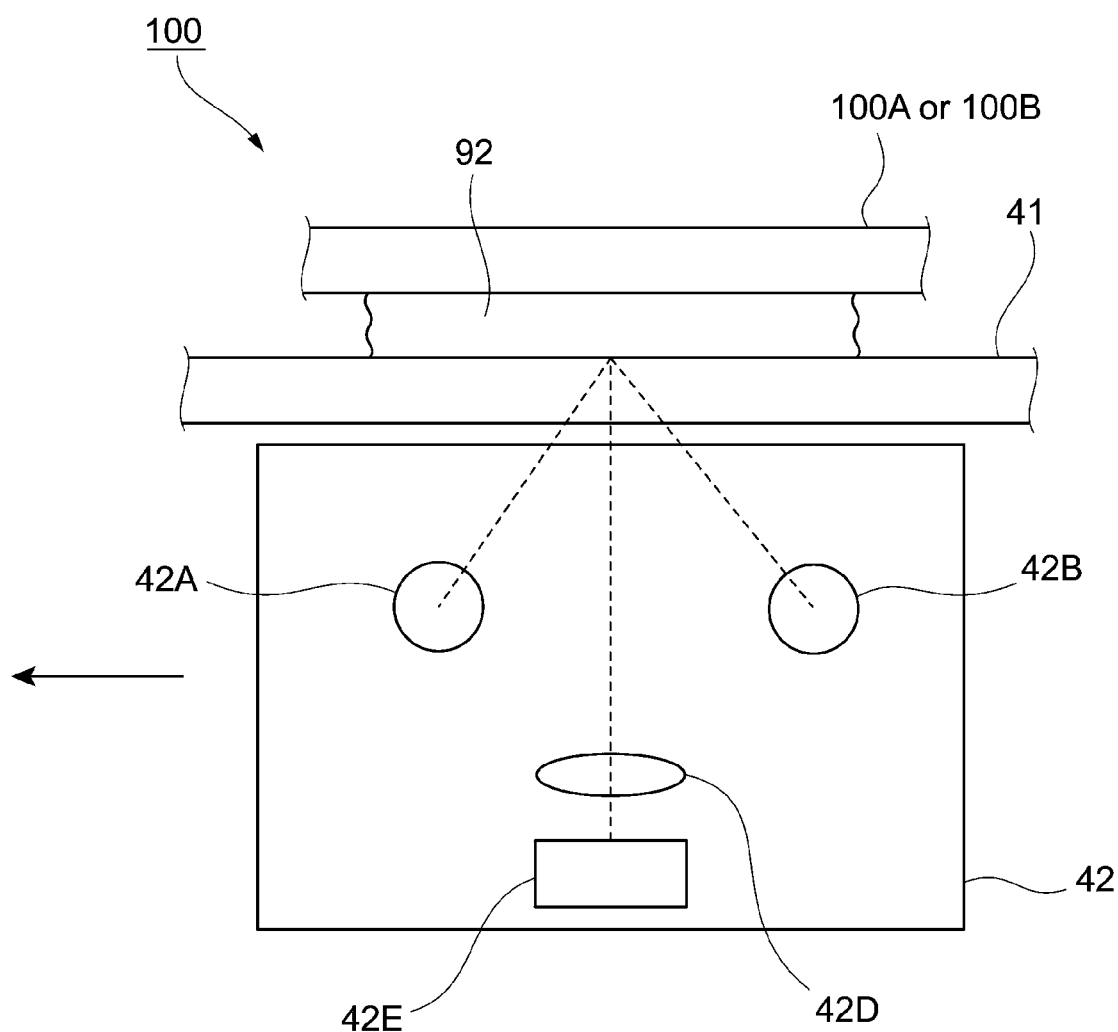
FIG. 2 is a diagram for explaining a scanner device.

FIG. 2 is a diagram for explaining the scanner device 100.

The scanner device 100 includes a platen glass 41 that supports the patch formation sheet 92 from underneath, and a carriage 42 that houses an optical system for scanning.

The carriage 42 moves along the surface of the flat platen glass 41. The carriage 42 is provided with light sources 42A and 42B that emit light toward the patch formation sheet 92, an imaging optical system 42D, and an imaging sensor 42E.

The carriage 42 is moved by a driving mechanism not illustrated. Known technology is used for the driving mechanism not illustrated and its control system.

The carriage 42 is attached to a housing not illustrated. The carriage 42 is housed inside the housing not illustrated.

The carriage 42 has a predetermined length in the direction perpendicular to the plane of the page in FIG. 2. The direction perpendicular to the plane of the page corresponds to a main scanning direction of the carriage 42. On the other hand, the direction indicated by the arrow corresponds to the sub scanning direction of the carriage 42.

In the case of reading information on the surface of the patch formation sheet 92, the carriage 42 moves in the direction of the arrow. In other words, when scanning the patch formation sheet 92, the carriage 42 moves in the sub scanning direction at a predetermined speed.

The platen glass 41 is a glass plate, for example. The platen glass 41 may be any transparent member such as an acrylic plate, for example.

Also, as described above, the scanner device 100 according to the exemplary embodiment is provided with the white background plate 100A and the black background plate 100B, and when scanning the patch formation sheet 92, either the white background plate 100A or the black background plate 100B is installed by the user.

Specifically, either the white background plate 100A or the black background plate 100B is installed on top of the patch formation sheet 92 placed on the platen glass 41. At this time, the white surface of the white background plate 100A or the black surface of the black background plate 100B faces the platen glass 41.

For the light source 42A and the light source 42B, a fluorescent lamp or a noble gas fluorescent lamp (such as a xenon fluorescent lamp) is used, for example. The light source 42A and the light source 42B may also be configured with multiple white light-emitting diodes (LEDs).

In this configuration example, two light sources 42A and 42B are disposed, but it is also possible to provide only a single light source. Furthermore, the patch formation sheet 92 may also be irradiated with light from multiple different directions by a method such as reflecting light emitted from a single light source.

The imaging optical system 42D includes a reflecting mirror and an imaging lens, for example, and forms an image of the light from the surface of the patch formation sheet 92 onto the light-receiving face of the imaging sensor 42E.

In the imaging sensor 42E multiple light-receiving elements (not illustrated) are arranged in the main scanning direction. The imaging sensor 42E outputs the intensity of the light condensed into an image on the light-receiving face as an image signal. For the imaging sensor 42E, a charge-coupled device (CCD) linear image sensor or a complementary metal-oxide semiconductor (CMOS) image sensor is used, for example.

A color filter not illustrated is disposed on the surface of the imaging sensor 42E.

With this arrangement, the imaging sensor 42E outputs a color image signal as a scan result of the patch formation sheet 92.

The color image signal is given by component values for the three colors of red (R), green (G), and blue (B).

FIG. 3 is a diagram illustrating a generated first conversion table 81.

In the diagram, information about the original image data 90 is displayed in the left column. More specifically, in the left column of the diagram, first color information indicating the color of each pixel is registered for each of the pixels forming the original image data 90.

More specifically, in the left column of the diagram, the original image data 90 in the CMYK-Spot color space is registered for each of the pixels forming the original image data 90.

More specifically, in this example, as indicated by the sign 3A for instance, the color information (C, M, Y, K, spot color)=(0, 20, 0, 0, 80) is registered as first color information for the pixels forming a certain patch image 1.

More specifically, in this example, the component value of each color material is registered as the first color information for the pixels forming a single patch image 1.

In this example, a component value of 20 for magenta, a component value of 80 for the spot color, and a component value of 0 for cyan, yellow, and black are registered as the first color information of the pixels forming a single patch image 1.

Here, the spot color may include multiple colors such as silver, gold, and clear, but in this example, only one of these colors is used as the spot color. For example, gold is used.

In this way, in the exemplary embodiment, a patch image 1 having first color information (C, M, Y, K, spot color)=(0, 20, 0, 0, 80) exists in the original image data 90.

In the first conversion table 81, the first color information (C, M, Y, K, spot color)=(0, 20, 0, 0, 80) is registered as information about the colors included in the patch image 1.

Also, in the first conversion table 81 of the exemplary embodiment, scan image data in the RGB color space obtained while the white background plate 100A is installed behind the patch formation sheet 92 is registered in the right column of the diagram.

In other words, in the right column of the diagram in the first conversion table 81, scan image data in the RGB color space is registered as color information (second color information) about the formed image, that is, the image formed on the patch formation sheet 92 on the basis of the original image data 90.

Specifically, in the first conversion table 81 of the exemplary embodiment, as indicated by the sign 3B, the second color information (R, G, B)=(185, 151, 95) is registered as one example of scan image data in the RGB color space.

This second color information (R, G, B)=(185, 151, 95) in the RGB color space is associated with the first color information (C, M, Y, K, spot color)=(0, 20, 0, 0, 80).

This example illustrates a case where a patch image 2 formed on the patch formation sheet 92 on the basis of the first color information (C, M, Y, K, spot color)=(0, 20, 0, 0, 80) is read by the scanner device 100 as the RGB value (185, 151, 95).

In other words, this example illustrates a case where pixels formed on the patch formation sheet 92 on the basis of the first color information (C, M, Y, K, spot color)=(0, 20, 0, 0, 80) are read by the scanner device 100 as the RGB value (185, 151, 95).

In this case, the RGB value (185, 151, 95) (second color information) is associated with the first color information (C, M, Y, K, spot color)=(0, 20, 0, 0, 80).

Additionally, the first color information (C, M, Y, K, spot color)=(0, 20, 0, 0, 80) and the RGB value (185, 151, 95) (second color information) are registered in association with each other in the first conversion table 81.

The RGB value (185, 151, 95) is the RGB value of formed pixels formed on the basis of the first color information (C, M, Y, K, spot color)=(0, 20, 0, 0, 80) from among the RGB values included in the above white background scan image data.

More specifically, the RGB value (185, 151, 95) is an average of the RGB values of multiple formed pixels formed on the basis of the first color information (C, M, Y, K, spot color)=(0, 20, 0, 0, 80).

More specifically, in the exemplary embodiment, one RGB value corresponding to a single patch image 2 is obtained for each patch image 2.

More specifically, in the exemplary embodiment, multiple formed pixels are formed on the patch formation sheet 92 on the basis of the first color information in the CMYK-Spot color space of a single patch image 1, and are formed inside a single patch image 2 corresponding to the single patch image 1.

In the exemplary embodiment, an RGB value is acquired for each of the multiple formed pixels. Additionally, in the exemplary embodiment, by taking the average value of the multiple obtained RGB values, a single RGB value (second color information) corresponding to the single patch images 1 and 2 is obtained.

The RGB value (second color information) of (185, 151, 95) above is the average of the RGB values of each of the multiple formed pixels included in the single patch image 2 generated on the basis of the first color information (C, M, Y, K, spot color)=(0, 20, 0, 0, 80).

In the exemplary embodiment, the first conversion table 81 is used to perform color conversion for a simulation image described later.

At this time, in the exemplary embodiment, a pixel having the color information (C, M, Y, K, spot color)=(0, 20, 0, 0, 80) in the simulation image is converted to the RGB value of (R, G, B)=(185, 151, 95), for example.

Furthermore, as indicated by the sign 3C in FIG. 3, a transmittance parameter Tr (0.8) indicating the degree of light transmittance is registered in the first conversion table 81 of the exemplary embodiment.

In other words, in the first conversion table 81, the transmittance parameter Tr is registered as an example of light transmittance information to the right of the second color information expressed by an RGB value in the diagram.

In other words, in the exemplary embodiment, the transmittance parameter Tr indicating the degree of light transmittance at the location where a pixel is positioned is registered in association with each of the pixels.

The transmittance parameter Tr will be described.

In the exemplary embodiment, the transmittance parameter Tr is obtained on the basis of white background scan image data obtained while the white background plate 100A is installed and black background scan image data obtained while the black background plate 100B is installed.

In other words, in the exemplary embodiment, the transmittance parameter Tr is obtained on the basis of scan image data of the patch formation sheet 92 obtained while the white background plate 100A is installed and scan image data of the patch formation sheet 92 obtained while the black background plate 100B is installed.

More specifically, in the exemplary embodiment, the transmittance parameter Tr is obtained for each pixel on the basis of the RGB value obtained with the white background plate 100A and the RGB value obtained with the black background plate 100B.

Figure 4:
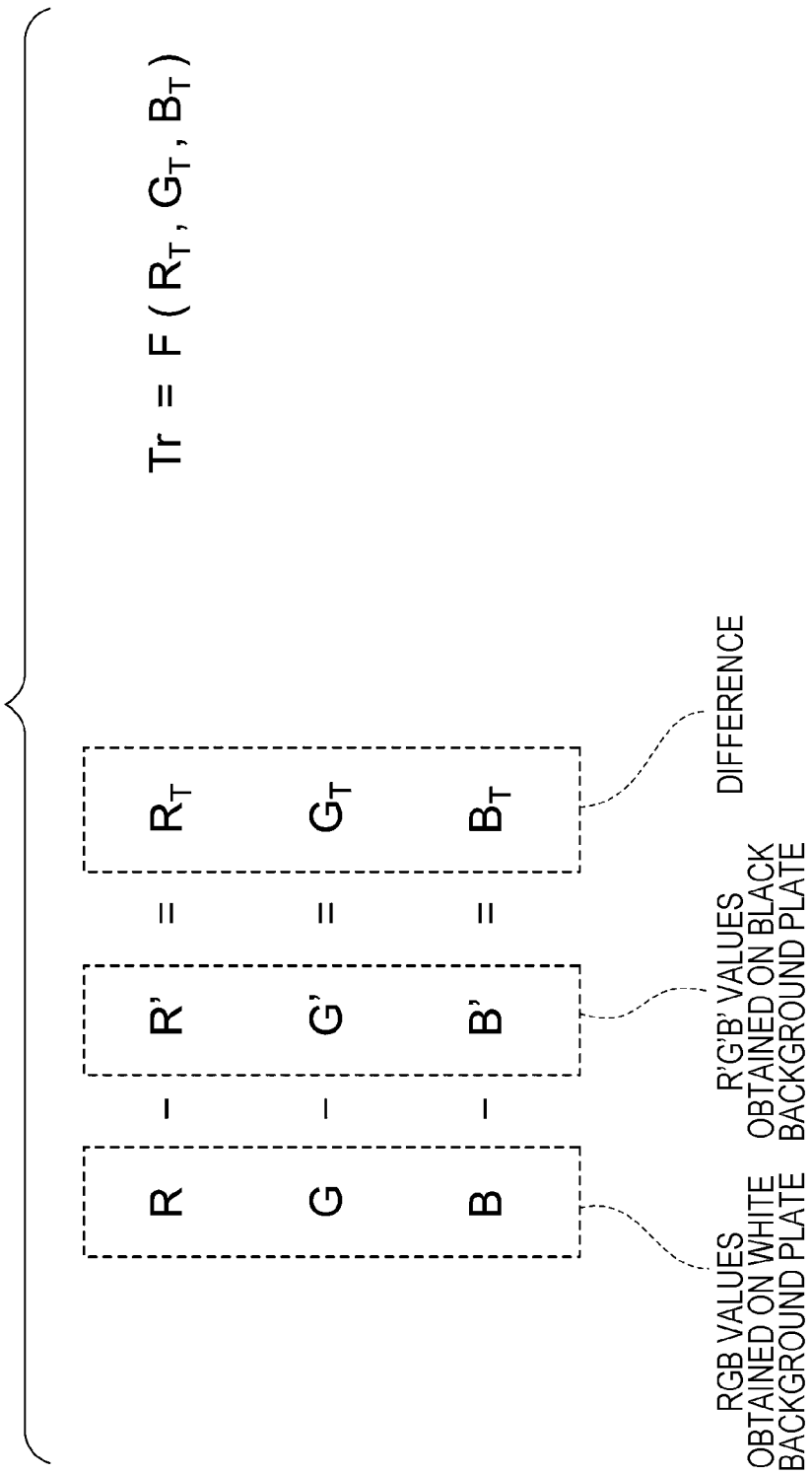
FIG. 4 is a diagram for explaining a process when acquiring a transmittance parameter.

More specifically, in the exemplary embodiment, as indicated by the left side of FIG. 4 (a diagram for explaining a process when acquiring the transmittance parameter Tr), when acquiring the transmittance parameter Tr, the difference between the RGB value obtained with the white background plate 100A and the R'G'B' value obtained with the black background plate 100B is obtained.

More specifically, for each of the R value, the G value, and the B value, the value obtained with the black background plate 100B is subtracted from the value obtained with the white background plate 100A to obtain the differences $R_T$, $G_T$, and $B_T$, for example.

Additionally, in the exemplary embodiment, the three differences $R_T$, $G_T$, and $B_T$ are substituted into a predetermined function $F(R_T, G_T, B_T)$ to obtain the transmittance parameter Tr, as indicated by the right side of FIG. 4.

The function $F(R_T, G_T, B_T)$ is a function that returns a larger transmittance parameter Tr for larger values of each of $R_T$, $G_T$, and $B_T$.

In the exemplary embodiment, the transmittance parameter Tr is set such that as the difference between the RGB value obtained with the white background plate 100A and the R'G'B' value obtained with the black background plate 100B increases, the transmittance parameter Tr becomes larger.

Also, as described above, in the exemplary embodiment, the transmittance parameter Tr is set to a value in the range from 0 to 1, for example. Also, in the exemplary embodiment, a larger value of the transmittance parameter Tr indicates a higher transmittance of light.

Here, the transmittance of light increases in the case where the sheet that acts as the substrate of the patch formation sheet 92 is thin, and in locations of the patch formation sheet 92 where a patch image 2 of lighter color is formed. In such cases, the R'G'B' value obtained while the black background plate 100B is installed is influenced more by the black background plate 100B.

Additionally, in this case, the difference between the RGB value obtained with the white background plate 100A and the R'G'B' value obtained with the black background plate 100B increases. Furthermore, in this case, the transmittance parameter Tr increases.

On the other hand, the transmittance of light decreases in the case where the sheet that acts as the substrate of the patch formation sheet 92 is thick, and in locations of the patch formation sheet 92 where a patch image 2 of darker color is formed. In this case, the R'G'B' value is influenced less by the black background plate 100B.

Additionally, in this case, the difference between the RGB value obtained with the white background plate 100A and the R'G'B' value obtained with the black background plate 100B decreases. Furthermore, in this case, the transmittance parameter Tr decreases.

In the exemplary embodiment, a single transmittance parameter Tr is acquired for each of the single patch images 1 and 2.

More specifically, in the exemplary embodiment, multiple pixels are formed on the patch formation sheet 92 on the basis of the first color information in the CMYK-Spot color space of a single patch image 1. In other words, multiple pixels are formed on the patch formation sheet 92 in correspondence with a single patch image 1.

In the exemplary embodiment, the formula described above is used to obtain the transmittance parameter Tr for each of the multiple pixels. Additionally, in the exemplary embodiment, by taking the average value of the multiple obtained transmittance parameters Tr, a transmittance parameter Tr corresponding to the single patch images 1 and 2 is obtained.

Here, in the exemplary embodiment, as described above, color information of the original image data 90 is acquired as the first color information, but a single piece of first color information is acquired for each patch image 1.

In other words, although a single patch image 1 includes multiple pixels, when acquiring color information of the original image data 90 as the first color information, a single set of first color information having a substantially common value for each of the multiple pixels is acquired.

Additionally, in the exemplary embodiment, the single piece of first color information is registered in the first conversion table 81.

Also, in the exemplary embodiment, color information of the formed pixels, that is, the pixels formed on the patch formation sheet 92 on the basis of the first color information having a common value for each of the pixels, is acquired as the second color information.

Furthermore, the transmittance parameter Tr is acquired, which is information about the degree of light transmittance at the location on the patch formation sheet 92 where the formed pixels are formed.

Additionally, in the exemplary embodiment, the first color information, the second color information, and the transmittance parameter Tr acquired for each pixel are associated with each other to generate the first conversion table 81.

The image data indicated by the sign 1C in FIG. 1 illustrates an image 94 that is the subject of simulation (hereinafter referred to as the "simulation image data 94").

In other words, the simulation image data 94 indicated by the sign 1C in FIG. 1 is the image data of an image whose translucency or sheerness is to be ascertained.

Also, the simulation image data 94 is an example of input image data, and is image data that is input by the user and contains color information.

In the exemplary embodiment, it is possible to perform a simulation of the translucency or sheerness of a sheet when forming an image on the sheet.

The simulation image data 94 is input into the information processing device 110 storing the first conversion table 81 generated as described above.

Note that the exemplary embodiment describes an example of a case where the information processing device that generates the first conversion table 81 and the information processing device that performs the simulation are the same.

However, the configuration is not limited thereto. A first information processing device that generates the first conversion table 81 and another information processing device that performs the simulation may be prepared, and the simulation may be performed by the other information processing device. In this case, the first conversion table 81 generated by the first information processing device is used by the other information processing device.

When the simulation image data 94 illustrated in FIG. 1 is input into the information processing device 110, an image based on the simulation image data 94 is displayed on a display device 200 connected to the information processing device 110.

More specifically, in the exemplary embodiment, the display device 200 displays a state for the case of forming an image based on the simulation image data 94 onto a formation sheet (one example of a formation medium), which is a sheet on which the patch images 2 describe above are formed.

In other words, in the exemplary embodiment, the state for the case of forming an image based on the simulation image data 94 onto a sheet that acts as the substrate of the patch formation sheet 92 is displayed on the display device 200.

The simulation image data 94 is image data in the CMYK-Spot color space.

When the simulation image data 94 is input into the information processing device 110, the information processing device 110 generates simulation image data 94 in the RGB color space on the basis of the simulation image data 94 in the CMYK-Spot color space.

More specifically, in the information processing device 110, the simulation image data 94 is converted to simulation image data 94 in the RGB color space on the basis of the first conversion table 81 (see FIG. 3) generated as described above and the simulation image data 94 in the CMYK-Spot color space.

In other words, in the information processing device 110, the color information of the simulation image data 94 is converted to color information in another color space different from the color space of the color information.

With this arrangement, simulation image data 94 in the RGB color space is generated in the information processing device 110.

More specifically, for example, in the case where the simulation image data 94 includes a pixel having the color information (C, M, Y, K, spot color)=(0, 20, 0, 0, 80), the color information of the pixel is converted to the color information (R, G, B)=(185, 151, 95).

More specifically, for example, in the case where the simulation image data 94 includes a pixel having the color information (C, M, Y, K, spot color)=(0, 20, 0, 0, 80), the information processing device 110 first references the location indicated by the sign 3E in FIG. 3, and ascertains (0, 20, 0, 0, 80) indicated by the sign 3A as the first color information having a predetermined relationship with the color information of the pixel.

Next, the information processing device 110 references the row indicated by the sign 3E in FIG. 3 to obtain (R, G, B)=(185, 151, 95) as the second color information associated with the ascertained first color information.

Also, in the exemplary embodiment, the information processing device 110 references the row indicated by the sign 3E in FIG. 3 to obtain the transmittance parameter Tr (0.8) associated with the ascertained first color information above.

In other words, the information processing device 110 obtains the transmittance parameter Tr (0.8) which is information associated with (R, G, B)=(185, 151, 95) ascertained as the second color information.

In addition, the information processing device 110 similarly obtained the second color information as an RGB value and the transmittance parameter Tr for each of the other pixels forming the simulation image data 94.

In this way, in the exemplary embodiment, the color information for each pixel forming the simulation image data 94 treated as the input image data is converted into color information in another color space.

Also, in the exemplary embodiment, light transmittance information associated with the color information in the other color space, namely the transmittance parameter Tr, is obtained for each pixel forming the simulation image data 94.

Note that in the case where the first color information corresponding to the color information included in the simulation image data 94 is not registered in the first conversion table 81, an interpolation process is performed.

More specifically, in the case where the first color information corresponding to the color information included in the simulation image data 94 is not registered in the first conversion table 81, first color information similar to the color information included in the simulation image data 94 is specified from the first conversion table 81.

Thereafter, the second color information and the transmittance parameter Tr corresponding to the similar first color information are obtained.

Here, the similar first color information may be the closest first color information or the first color information positioned within a predetermined distance in the color space to the color information included in the simulation image data 94.

In the exemplary embodiment, in the case where the simulation image data 94 is acquired, first, the first color information having a predetermined relationship with the color information of a constituent pixel forming the simulation image data 94 is ascertained.

Here, in the case where first color information matching the color information of a constituent pixel exists, the first color information having a predetermined relationship refers to the matching first color information. Also, in the case where first color information matching the color information of a constituent pixel does not exist, the first color information having a predetermined relationship refers to first color information that is similar to the color information of the constituent pixel.

Additionally, in the exemplary embodiment, the second color information and the transmittance parameter Tr associated with the first color information are acquired as described above.

When the second color information as an RGB value and the transmittance parameter Tr are obtained for each of the pixels forming the simulation image data 94, the information processing device 110 displays an image based on the obtained information on the display device 200.

Specifically, the information processing device 110 controls the display device 200 on the basis of the second color information as an RGB value and the transmittance parameter Tr obtained from the first conversion table 81 for each of the pixels, and thereby displays an image based on the simulation image data 94 on the display device 200.

In the exemplary embodiment, for a pixel having the color information (C, M, Y, K, spot color)=(0, 20, 0, 0, 80) included in the simulation image data 94, for example, the information processing device 110 controls the display operations by the display device 200 on the basis of the second color information (R, G, B)=(185, 151, 95).

Also, when controlling the display for the pixel having the color information (R, G, B)=(185, 151, 95), the information processing device 110 controls the display of the pixel while also accounting for the transmittance parameter Tr (0.8).

Here, the transmittance parameter Tr (0.8) above indicates a high degree of transmittance.

In this case, when displaying a pixel having the second color information (R, G, B)=(185, 151, 95) (hereinafter referred to as the "target pixel"), the information processing device 110 newly sets the RGB value of the target pixel while also accounting for the color information of another pixel positioned behind the target pixel.

Additionally, the information processing device 110 controls the display such that the target pixel is displayed with the newly set RGB value.

More specifically, when displaying the target pixel, the information processing device 110 controls the display for the target pixel by considering the RGB value (hereinafter referred to as the "background RGB value") of the pixel (hereinafter referred to as the "background pixel") positioned behind the target pixel, the background pixel being a pixel forming a background image positioned behind the simulation image to be displayed.

More specifically, the information processing device 110 sets a new RGB value for the target pixel on the basis of the RGB value of the target pixel, the background RGB value, and the transmittance parameter Tr of the target pixel.

Thereafter, the information processing device 110 controls the display for the target pixel according to the newly set RGB value.

Here, for example, in the case where the transmittance parameter Tr of the target pixel is 0.8, the degree of light transmittance is high, and the target pixel is greatly influenced by the color of the background pixel positioned behind the target pixel.

In this case, the information processing device 110 sets the new RGB value for the target pixel to increase the influence of the background RGB value on the RGB value of the target pixel, for example.

Additionally, the information processing device 110 controls the display with the new RGB value for the target pixel.

On the other hand, for example, in the case where the transmittance parameter Tr of the target pixel is 0, the target pixel is not influenced by the color of the background pixel positioned behind the target pixel.

In this case, for the target pixel having the second color information (R, G, B)=(185, 151, 95), the information processing device 110 controls the display of the target pixel with the color information (R, G, B)=(185, 151, 95), for example.

Figure 5:
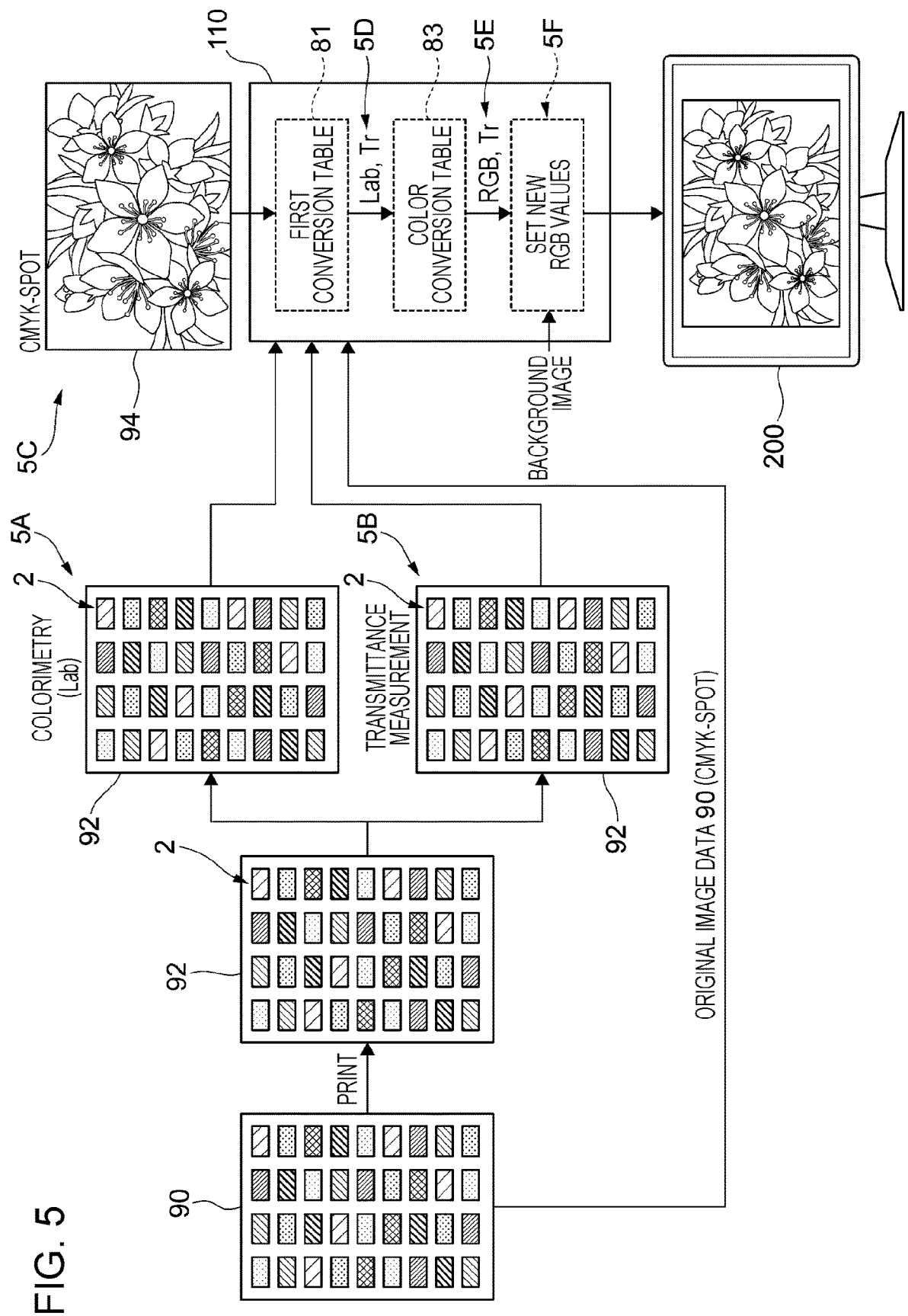
FIG. 5 is a diagram for explaining another process example.

FIG. 5 is a diagram for explaining another process example.

In the process example, like the description above, printing is performed on the basis of the original image data 90 on a sheet whose translucency or sheerness is to be ascertained, and a patch formation sheet 92 is obtained.

Next, in this process example, a special-purpose colorimeter (not illustrated) is used to obtain a colorimetry value for each of the patch images 2 on the patch formation sheet 92, as indicated by the sign 5A. Specifically, in this process example, a colorimetry value in the Lab color space is obtained for each of the patch images 2.

Furthermore, in this process example, the patch formation sheet 92 is placed in a special-purpose transmittance measurement device (not illustrated) that measures the transmittance of light, and as indicated by the sign 5B, the transmittance is measured for each of the locations where the patch images 2 are formed on the patch formation sheet 92.

Additionally, in the exemplary embodiment, on the basis of the results of the transmittance measurement, the information processing device 110 acquires the transmittance parameter Tr for each of the locations where the patch images 2 are formed.

Like the description above, the transmittance parameter Tr is set to a numerical value in the range from 0 to 1, for example. A larger numerical value indicates a higher transmittance of light.

Next, in this process example, like the description above, the information processing device 110 generates the first conversion table 81 on the basis of the original image data 90 containing the first color information, the colorimetry values in the Lab color space (second color information), and the transmittance parameter Tr, and registers the first conversion table 81 in the information processing device 110.

FIG. 6 is a diagram illustrating the generated first conversion table 81.

The first conversion table 81 is a conversion table for converting image data in the CMYK-Spot color space to image data in the Lab color space.

In the first conversion table 81, first color information in the CMYK-Spot color space is registered in the column on the left side of the diagram, similarly to the description above. Also, in the column on the right side of the diagram, second color information in the Lab color space and the transmittance parameter Tr are registered.

In this example, as indicated by the sign 6A, (C, M, Y, K, spot color)=(0, 20, 0, 0, 80) is registered as the first color information of a pixel included in the original image data 90.

Also, in this example, as indicated by the sign 6B, the second color information (L, a, b)=(E, F, G) is registered in association with the first color information (C, M, Y, K, spot color)=(0, 20, 0, 0, 80). Note that E, F, and G each express a numerical value.

Also, in the first conversion table 81, as indicated by the sign 6C, the transmittance parameter Tr (H) is registered in association with the first color information (C, M, Y, K, spot color)=(0, 20, 0, 0, 80) and the second color information (L, a, b)=(E, F, G). Here, H is also a numerical value, and like the description above, H is set to a value in the range from 0 to 1, for example.

In this process example, the simulation image data 94 in the CYMK-Spot color space indicated by the sign 5C in FIG. 5 is input into the information processing device 110.

Additionally, in the information processing device 110, the first conversion table 81 illustrated in FIG. 6 is used to convert color information in the CMYK-Spot color space to color information in the Lab color space for each of the multiple pixels forming the simulation image data 94, as indicated by the sign 5D.

Also, at this time, the information processing device 110 obtains the transmittance parameter Tr for each of the multiple pixels.

More specifically, for example, in the case where the simulation image data 94 includes a pixel having the color information (C, M, Y, K, spot color)=(0, 20, 0, 0, 80), the information processing device 110 references the first conversion table 81 in FIG. 6 to ascertain the first color information (0, 20, 0, 0, 80) indicated by the sign 6A as the first color information having a predetermined relationship with the color information of the pixel.

Next, the information processing device 110 acquires (L, a, b)=(E, F, G) as the second color information associated with the first color information (0, 20, 0, 0, 80).

Also, the information processing device 110 acquires the transmittance parameter Tr (H), which is the transmittance parameter Tr associated with the first color information (0, 20, 0, 0, 80) and the second color information (L, a, b)=(E, F, G).

Additionally, the information processing device 110 obtains second color information in the Lab color space similarly for each of the other pixels forming the simulation image. The information processing device 110 also obtains the transmittance parameter Tr for each of the other pixels forming the simulation image.

Note that like the description above, the information processing device 110 performs an interpolation process in the case where first color information matching the color information included in the simulation image data 94 is not registered in the first conversion table 81. With this arrangement, the first color information, the second color information, and the transmittance parameter Tr corresponding to the color information included in the simulation image data 94 are obtained even in such a case.

Next, the information processing device 110 uses a pre-registered color conversion table 83 (see FIG. 5) to convert the second color information in the Lab color space obtained for each pixel to color information in the RGB color space for each pixel, as indicated by the sign 5E. In other words, the information processing device 110 converts a Lab value into an RGB value for each of the pixels.

Next, like the description above, the information processing device 110 newly sets an RGB value for each pixel on the basis of the RGB value for each pixel obtained by converting the Lab value to an RGB value, the transmittance parameter Tr obtained for each pixel, and the background image, as indicated by the sign 5F.

Specifically, like the description above, for a target pixel having a high transmittance parameter Tr, the information processing device 110 sets a new RGB value by raising the degree to which the background RGB value affects the RGB value of the target pixel.

Additionally, for a target pixel having a low transmittance parameter Tr, the information processing device 110 sets a new RGB value by lowering the degree to which the background RGB value affects the RGB value of the target pixel.

In the process example illustrated in FIG. 1, the RGB value obtained by scanning the patch formation sheet 92 changes easily because of factors such as change over time in the scanner device 100 that reads the patch formation sheet 92. In this case, the first conversion table 81 generated on the basis of the RGB values is also influenced by factors such as change over time in the scanner device 100.

In contrast, in the process example illustrated in FIG. 5, a special-purpose colorimeter is used to measure one or more physical properties related to color. Consequently, in the process example illustrated in FIG. 5, the first conversion table 81 is generated in a state of reduced influence by factors such as change over time in the equipment.

In other words, in the process example illustrated in FIG. 5, device-independent color information is acquired as the second color information expressing color information about the formed image formed on the patch formation sheet 92.

In other words, in the process example illustrated in FIG. 5, the scan result obtained by using a colorimeter to read the colors of the formed image formed on the patch formation sheet 92 on the basis of the original image data 90 is acquired as device-independent second color information.

Furthermore, in the exemplary embodiment, the first color information included in the original image data 90, the device-independent second color information, and the transmittance parameter Tr expressing information about the degree of light transmittance are associated with each other.

Figure 7:
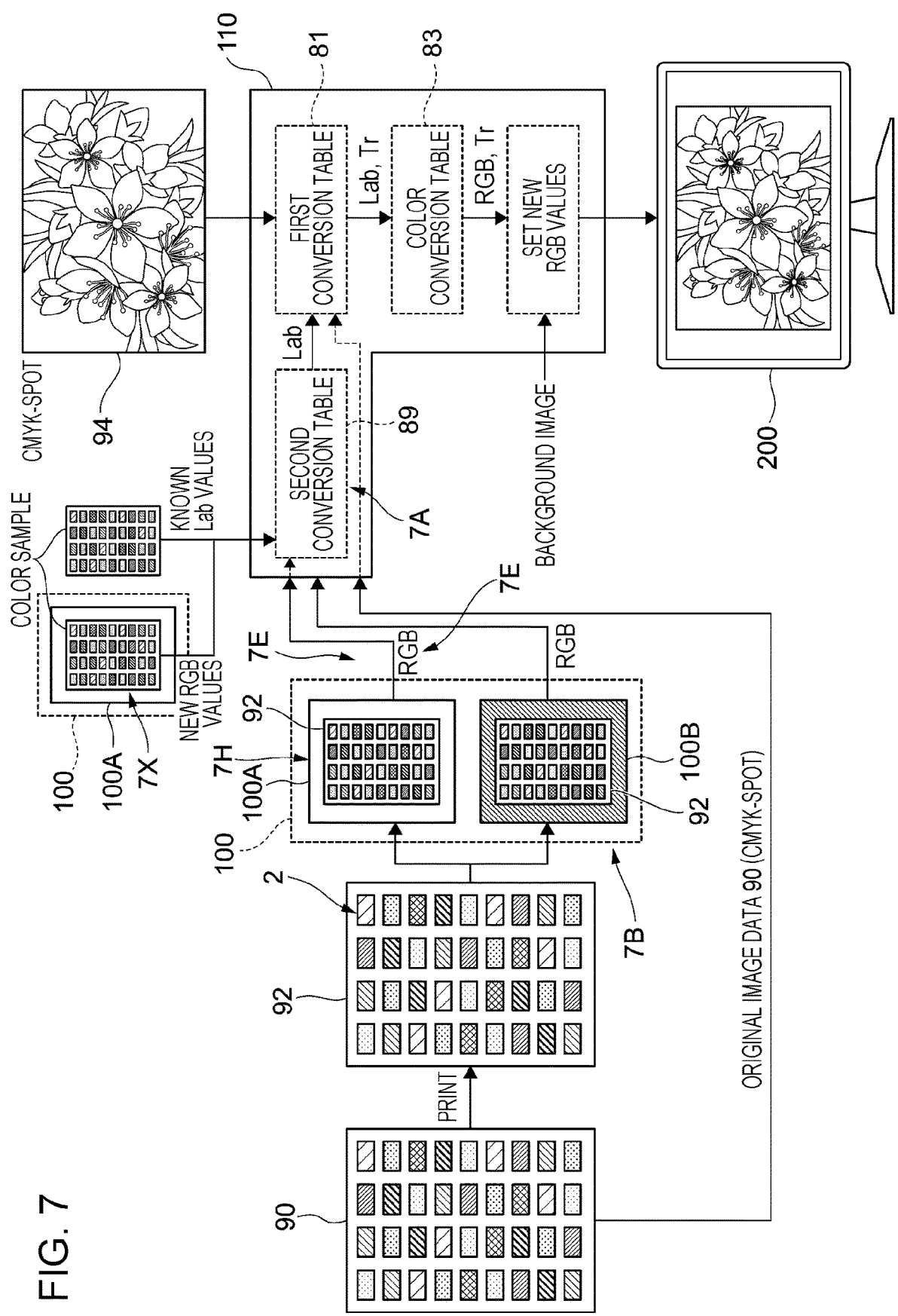
FIG. 7 is a diagram for explaining another process example.

FIG. 7 is a diagram for explaining another process example.

In this process example, in the portion indicated by the sign 7A in the diagram, image data in the RGB color space obtained by reading the patch formation sheet 92 is converted into Lab image data.

In this process example, a second conversion table 89 for converting RGB values to Lab values is registered in the information processing device 110.

In the information processing device 110, the second conversion table 89 is used to convert the RGB value of each pixel included in the scan image data obtained in the state with the white background plate 100A installed (that is, the white background scan image data) to a Lab value.

In other words, in this process example, the second conversion table 89 indicated by the sign 7A is used to convert the RGB value expressing device-dependent color information as the scan result obtained by reading the formed image formed on the patch formation sheet 92 (see the sign 7H) with the scanner device 100 to a Lab value expressing device-independent color information.

In this process example, the Lab value expressing device-independent color information obtained by this conversion is acquired as device-independent second color information.

Additionally, in this process example, the first color information included in the original image data 90 and the Lab value (second color information) obtained by the second conversion table 89 are registered in the first conversion table 81 to obtain a first conversion table 81 similar to the first conversion table 81 illustrated in FIG. 6.

In other words, in this process example, the first color information included in the original image data 90 and the second color information obtained by converting device-dependent color information to device-independent color information are registered in the first conversion table 81 to obtain a first conversion table 81 similar to the first conversion table 81 illustrated in FIG. 6.

More specifically, the first color information of each pixel in the CMYK-Spot color space and the Lab value (second color information) of each pixel obtained by the second conversion table 89 are registered in association with each other in the first conversion table 81.

With this arrangement, a first conversion table 81 similar to the first conversion table 81 illustrated in FIG. 6 is obtained.

More specifically, in this process example, multiple Lab values are obtained in correspondence with each of the multiple pixels included in a single patch image 2, and the average of the multiple Lab values is obtained. Additionally, the first color information about a single patch image 1 in the CMYK-Spot color space and the average value (second color information) are registered in association with each other in the first conversion table 81.

With this arrangement, a first conversion table 81 similar to the first conversion table 81 illustrated in FIG. 6 is obtained.

Also, in this process example, the patch formation sheet 92 is also scanned in a state with the black background plate 100B installed, as indicated by the sign 7B in FIG. 7.

Additionally, like the description above, the transmittance parameter Tr is ascertained for each pixel on the basis of the RGB value obtained while the white background plate 100A is installed and the RGB value obtained while the black background plate 100B is installed.

Thereafter, the transmittance parameter Tr is registered in the first conversion table 81 in association with each pixel.

More specifically, like the description above, the formula illustrated on the right side of FIG. 4 is used to obtain the transmittance parameter Tr for each of the multiple pixels formed on the patch formation sheet 92 on the basis of the color information in the CMYK-Spot color space of a single patch image 1.

Additionally, by taking the average value of the multiple obtained transmittance parameters Tr, a transmittance parameter Tr corresponding to the single patch images 1 and 2 is obtained.

Thereafter, the transmittance parameter Tr is registered in the first conversion table 81.

With this arrangement, a first conversion table 81 similar to the first conversion table 81 illustrated in FIG. 6 is generated.

In this process example, a Lab value for each patch image 2 may be acquired without using a special-purpose colorimeter. In other words, the Lab value of each pixel forming the patch formation sheet 92 may be acquired without using a special-purpose colorimeter.

In other words, in this process example, the Lab value of each patch image 2 may be acquired without performing colorimetry on each patch image 2 with a special-purpose colorimeter.

Note that as described above, the scanner device 100 changes over time. For this reason, the second conversion table 89 preferably updated periodically.

More specifically, as the scanner device 100 changes over time, the RGB values (the RGB values indicated by the sign 7E) obtained by scanning the patch formation sheet 92 also change.

In this case, if the second conversion table 89 is not updated, the Lab values obtained by using the second conversion table 89 will be different from the proper Lab values. Additionally, in this case, the Lab values registered in the first conversion table 81 will be different from the proper Lab values.

Consequently, in this process example, as indicated by the sign 7X, a color chart with known Lab values is placed in the scanner device 100, and RGB values are newly obtained with the white background plate 100A underneath. Thereafter, the known Lab values and the newly obtained RGB values are associated with each other to generate a new second conversion table 89.

In other words, a color-managed color chart archived in a predetermined archival location is placed in the scanner device 100 to obtain RGB values. Thereafter, the Lab values recorded in association with the color chart and the newly obtained RGB values are associated with each other to generate a new second conversion table 89.

After that, the new second conversion table 89 is used to convert the RGB values obtained by scanning the patch formation sheet 92 to Lab values. In addition, the Lab values obtained by the conversion and the original image data 90 are associated with each other to generate a new first conversion table 81.

Note that the process in the case where the simulation image data 94 is input into the information processing device 110 is similar to the process described with reference to FIG. 5, and therefore further description is omitted here.

Figure 8:
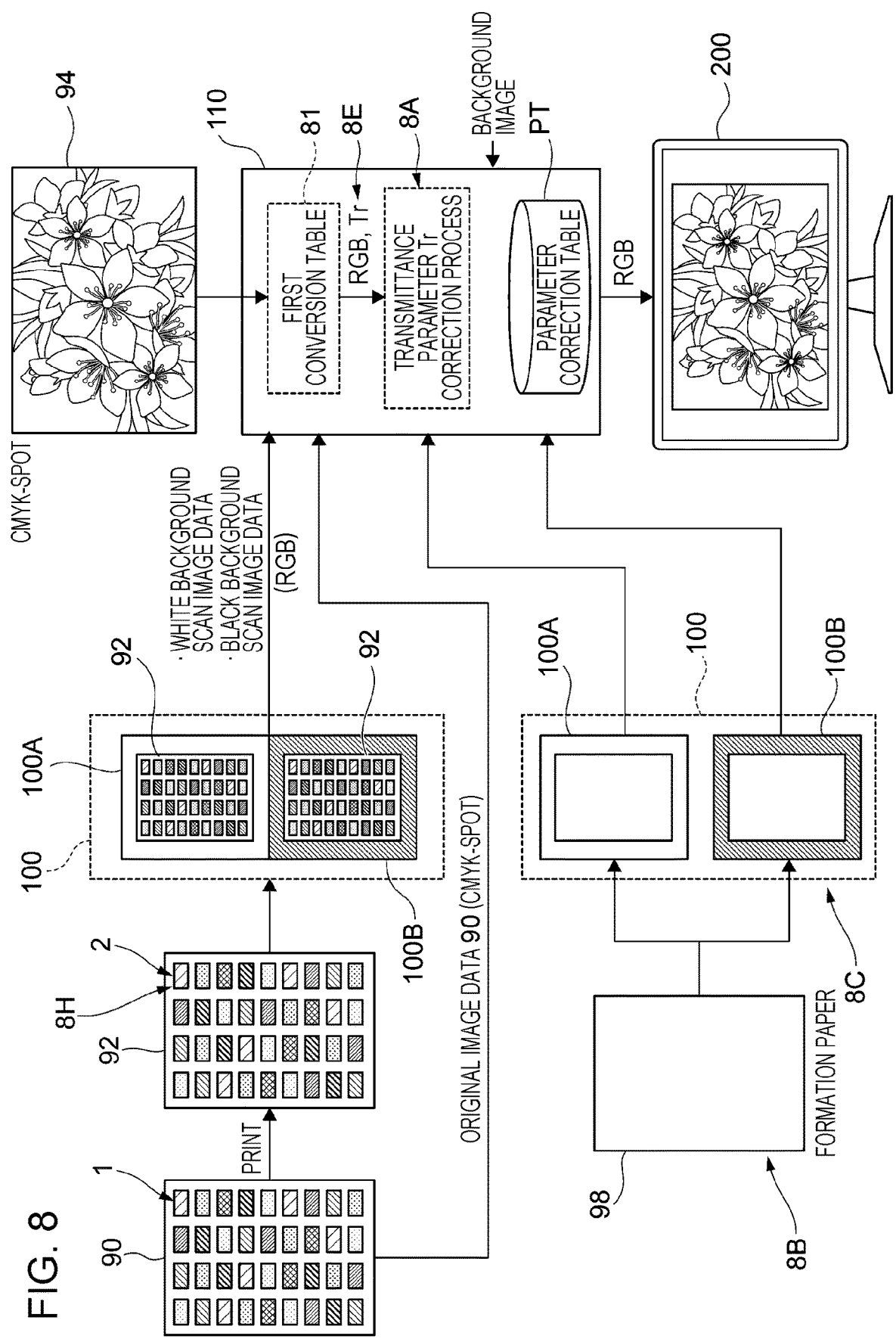
FIG. 8 is a diagram illustrating another process example.

FIG. 8 is a diagram illustrating another process example.

In the process illustrated in FIG. 8, in addition to the process illustrated in FIG. 1, a process of correcting the transmittance parameter Tr as indicated by the sign 8A is performed.

In the case of performing the process of correcting the transmittance parameter Tr, first, a formation sheet 98 is prepared, as indicated by the sign 8B. The formation sheet 98 is a sheet on which the patch images 2 given as an example of a formed image are formed.

The formation sheet 98 may be a sheet on which the patch images 2 are actually formed as indicated by the sign 8H, or a sheet of the same type as the sheet on which the patch images 2 are actually formed as indicated by the sign 8H. More specifically, the formation sheet 98 may be a sheet having the same serial number as the sheet on which the patch images 2 are actually formed as indicated by the sign 8H.

It is not necessary to form the patch images 2 on the formation sheet 98 itself. It is sufficient for the sheet on which the patch images 2 are formed and the formation sheet 98 to be sheets of the same type or sheets having the same serial number. The sheet on which the patch images 2 are formed may be a different sheet than the formation sheet 98.

The formation sheet 98 is a sheet on which to simulate the formation of an image based on the simulation image data 94. Moreover, the following description illustrates the process for the case of executing a simulation of the formation of an image on the formation sheet 98 based on the simulation image data 94.

Additionally, in this process example, the formation sheet 98 is scanned by the scanner device 100, as indicated by the sign 8C.

Specifically, the formation sheet 98 is scanned under conditions with the white background plate 100A installed and under conditions with the black background plate 100B installed, and two pieces of scan image data are generated.

Next, the two pieces of scan image data are used to obtain the transmittance parameter Tr for each pixel. In other words, the transmittance parameter Tr is obtained for each pixel according to a process similar to the process illustrated in FIG. 4.

In other words, in this process example, medium light transmittance information, that is, information expressing the degree of light transmittance by the formation sheet 98 given as an example of a formation medium, is obtained.

In other words, in this process example, the transmittance parameter Tr is acquired as medium information about the formation medium on which the patch images 2 given as an example of a formed image are formed.

In other words, in this process example, information related to the roughness (that is, depressed and raised portions) of the formation sheet 98 is acquired as the medium information. Here, the transmittance parameter Tr is influenced by the roughness of the formation sheet 98, and in this process example, the transmittance parameter Tr is acquired as information related to the roughness of the formation sheet 98.

Additionally, in the exemplary embodiment, the transmittance parameter Tr obtained for each pixel and position information about each pixel are registered in association with each other in a parameter correction table PT (see FIG. 8) stored in the information processing device 110.

Hereinafter, in this specification, the transmittance parameter Tr registered in the parameter correction table PT will be referred to as the correction parameter Tx.

When the simulation image data 94 is input into the information processing device 110, like the description above, the information processing device 110 uses the first conversion table 81 to obtain the RGB value and the transmittance parameter Tr for each pixel included in the simulation image data 94, as indicated by the sign 8E.

More specifically, in the case of acquiring the simulation image data 94 given as one example of input image data, like the description above, the information processing device 110 first ascertains, for each pixel of the simulation image data 94, the first color information having a predetermined relationship with the color information of a pixel included in the simulation image data 94.

Furthermore, like the description above, the information processing device 110 acquires the second color information and the transmittance parameter Tr associated with the ascertained first color information.

Furthermore, when the simulation image data 94 is input, the information processing device 110 acquires, for each of the pixels included in the simulation image data 94, position information indicating where each pixel is positioned on the basis of information included in the simulation image data 94.

In other words, in this process example, when the simulation image data 94 is input, the information processing device 110 acquires the RGB value, the transmittance parameter Tr, and the position information as information about each pixel.

Next, the information processing device 110 performs a process of correcting the transmittance parameter Tr acquired for each pixel. In other words, a process of correcting the transmittance parameter Tr obtained by using the first conversion table 81 is performed.

Specifically, the information processing device 110 uses the correction parameter Tx registered in the parameter correction table PT to perform the process of correcting the transmittance parameter Tr. In other words, the information processing device 110 modifies the transmittance parameter Tr on the basis of the correction parameter Tx registered in the parameter correction table PT.

In other words, the information processing device 110 modifies the transmittance parameter Tr given as an example of light transmittance information on the basis of the medium information expressing information about the formation sheet 98.

The process of modifying the transmittance parameter Tr will be described in detail.

For example, if the first conversion table 81 is used to obtain the transmittance parameter Tr for a certain pixel, the information processing device 110 reads out and acquires the correction parameter Tx corresponding to the position of the pixel from the parameter correction table PT.

Thereafter, the information processing device 110 uses the correction parameter Tx to correct the transmittance parameter Tr for the pixel.

Specifically, for example, in the case where the absolute value of the difference between the transmittance parameter Tr and the correction parameter Tx exceeds a predetermined threshold value, the information processing device 110 modifies the transmittance parameter Tr such that the value of the transmittance parameter Tr approaches the value of the correction parameter Tx.

With this arrangement, for example, the transmittance parameter Tr associated with a pixel disposed in a depressed portion of the formation sheet 98 from among the multiple pixels included in the simulation image data 94 is corrected to a transmittance parameter Tr that is larger than the original transmittance parameter Tr.

In other words, the transmittance parameter Tr is corrected to a transmittance parameter Tr that is larger than the transmittance parameter Tr registered in the first conversion table 81.

More specifically, this process example substantially specifies the pixels of the simulation image data 94 that would be positioned in depressed portions of the formation sheet 98 in the case of assuming that an image based on the simulation image data 94 is formed on the formation sheet 98.

In other words, this process example substantially specifies the pixels of the simulation image data 94 that would be positioned in thin portions of the formation sheet 98 in the case of assuming that an image based on the simulation image data 94 is formed on the formation sheet 98.

Additionally, this process example modifies the transmittance parameter Tr acquired for the pixels that would be positioned in the depressed portions.

More specifically, the transmittance parameter Tr is modified to increase the light transmittance specified by the transmittance parameter Tr acquired for the pixels that would be positioned in the depressed portions.

Also, this process example substantially specifies the pixels of the simulation image data 94 that would be positioned in raised portions of the formation sheet 98 in the case of assuming that an image based on the simulation image data 94 is formed on the formation sheet 98.

In other words, this process example substantially specifies the pixels of the simulation image data 94 that would be positioned in thick portions of the formation sheet 98 in the case of assuming that an image based on the simulation image data 94 is formed on the formation sheet 98.

Additionally, this process example modifies the transmittance parameter Tr acquired for the pixels that would be positioned in the raised portions.

More specifically, the transmittance parameter Tr is modified to decrease the light transmittance specified by the transmittance parameter Tr acquired for the pixels that would be positioned in the raised portions.

According to the above process, when displaying the simulation image data 94, the state of the roughness and the like of the formation sheet 98 is better represented on the display. In other words, in this case, the simulation image data 94 is displayed to better represent the state of the formation sheet 98.

More specifically, pixels positioned in locations where depressed portions of the formation sheet 98 exist are displayed with more translucency or sheerness, while pixels positioned in locations where raised portions of the formation sheet 98 exist are displayed with a reduced degree of translucency or sheerness.

As described above, in the exemplary embodiment, a single transmittance parameter Tr is the average value of multiple obtained transmittance parameters Tr.

In other words, in the exemplary embodiment, by taking the average value of the multiple obtained transmittance parameters Tr, a transmittance parameter Tr corresponding to the single patch images 1 and 2 is obtained.

In the exemplary embodiment, the single patch images 1 and 2 are formed in a planar shape, and the single patch images 1 and 2 each include multiple pixels.

In the exemplary embodiment, the transmittance parameter Tr is acquired for each of the multiple pixels included in the single patch images 1 and 2, and the average value of the multiple transmittance parameters Tr is treated as the transmittance parameter Tr to register in the first conversion table 81.

For instance, the transmittance parameter Tr indicated by the sign 3C in FIG. 3 is the average value of the multiple transmittance parameters Tr obtained for each of the multiple pixels included in the single patch image 2 indicated by the sign 1X in FIG. 1, for example.

In this case, for example, even if a depressed portion or a raised portion of small area exists inside the region of the patch formation sheet 92 where a single patch image 2 is formed, the depressed or raised portion hardly affects the transmittance parameter Tr.

In contrast, if the correction parameter Tx is used to correct the transmittance parameter Tr like in the exemplary embodiment, the degree to which depressed portions and raised portions affect the transmittance parameter Tr is increased. Furthermore, in this case, the simulation image data 94 is displayed to better represent the state of the formation sheet 98.

In other words, like the description above, the transmittance parameter Tr (pre-correction transmittance parameter Tr) obtained in the exemplary embodiment is an average value of multiple obtained transmittance parameters Tr, and may also be considered to be the transmittance parameter Tr in the case of assuming a sheet of uniform roughness.

In contrast, in this process example, the formation sheet 98 to be simulated is actually prepared, and information about the roughness (depressed and raised portions) of the formation sheet 98 is obtained.

Additionally, the correction parameter Tx is used to correct the transmittance parameter Tr corresponding to locations where the sheet is locally thicker and locations where the sheet is locally thinner.

Figure 9:
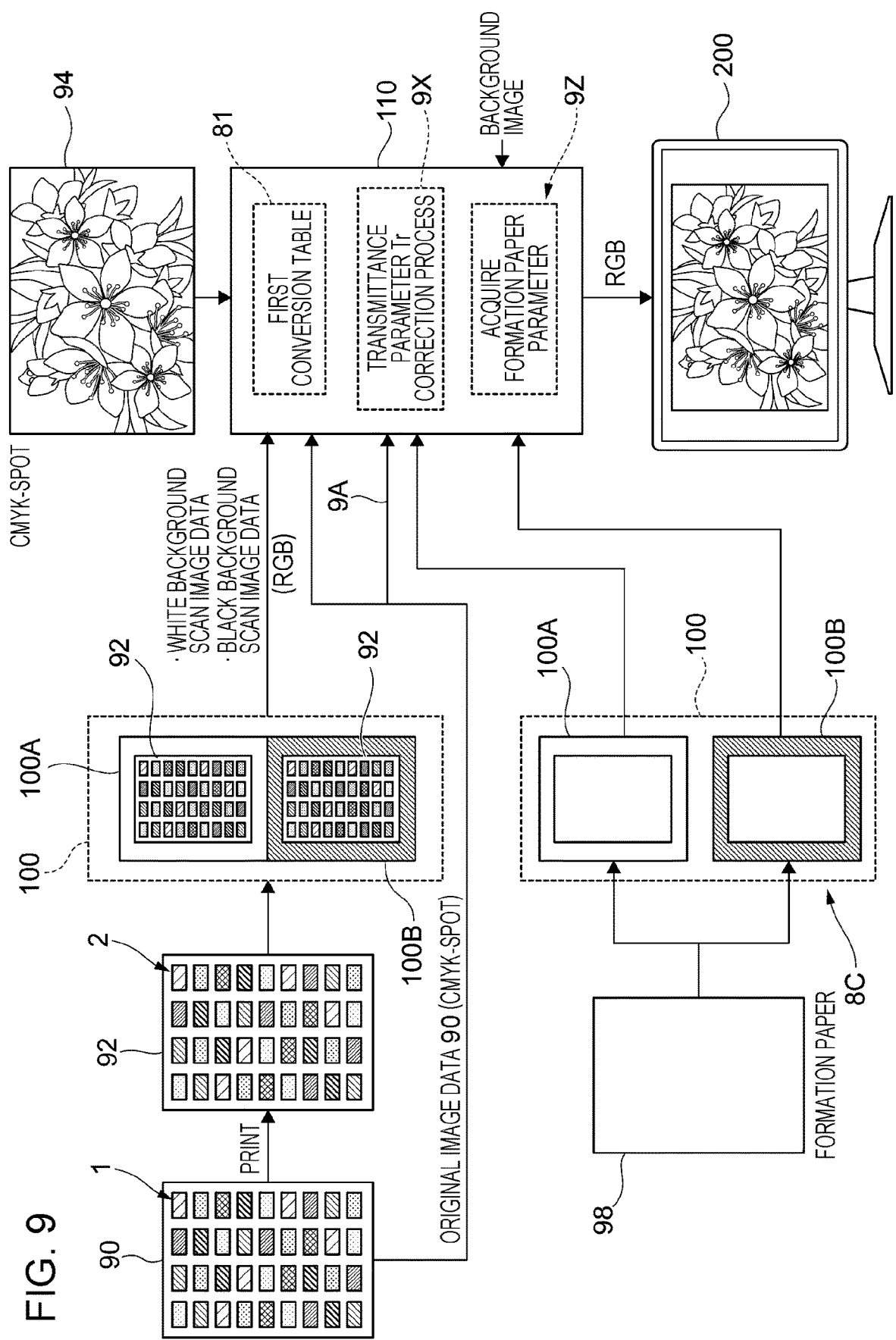
FIG. 9 is a diagram illustrating another process example.

FIG. 9 is a diagram illustrating another process example.

In this process example, the original image data 90 in the CMYK-Spot color space is also used to correct the transmittance parameter Tr, as indicated by the sign 9A.

Also, in this process example, the formation sheet 98 is also prepared like the description above, and the formation sheet 98 is scanned by the scanner device 100.

More specifically, in this case, the information processing device 110 first obtains the transmittance parameter Tr for the formation sheet 98 like the description above. More specifically, the transmittance parameter Tr is obtained for each pixel of the formation sheet 98.

Hereinafter, the transmittance parameter Tr obtained for each pixel of the formation sheet 98 will be referred to as the "formation sheet parameter Tz", and the information processing device 110 obtains the formation sheet parameter Tz for each pixel of the formation sheet 98, as indicated by the sign 9Z.

Next, in this process example, the average value of the formation sheet parameter Tz is obtained for each patch image 1 included in the original image data 90 in the CMYK-Spot color space.

More specifically, the original image data 90 in the CMYK-Spot color space includes multiple patch images 1, and in the exemplary embodiment, the average value of the formation sheet parameter Tz is obtained for each patch image 1.

More specifically, to perform this process, first, for each patch image 1, a formation region where a patch image 2 is formed on the formation sheet 98 on the basis of the patch image 1 is ascertained.

More specifically, in the exemplary embodiment, as illustrated in FIGS. 10A and 10B (diagrams illustrating the original image data 90 and the formation sheet 98), for each patch image 1, a patch image 2 based on the patch image 1 is formed on the formation sheet 98, and in this process example, the formation region where the patch image 2 is formed is ascertained for each patch image 1.

Additionally, in this process example, the formation sheet parameter Tz obtained for each of the multiple pixels included in each formation region are summed for each formation region to acquire the sum total of the formation sheet parameter Tz. Next, the sum total is divided by the total number of pixels.

With this arrangement, the average value of the formation sheet parameter Tz is obtained for each formation region. In other words, the average value of the formation sheet parameter Tz is obtained for each patch image 1 of each color.

Next, in this process example, the average values for which the magnitude of the value is in the top 10% of the multiple obtained average values are specified, for example. In other words, the average values satisfying a specific condition are specified from among the multiple obtained average values.

Additionally, the patch images 1 corresponding to the formation regions where the specified average values are obtained are specified.

Next, the transmittance parameter Tr obtained on the basis of each specified patch image 1 is specified. In other words, the transmittance parameter Tr corresponding to each patch image 1 is specified from among the information registered in the first conversion table 81 (see FIG. 9). In other words, the transmittance parameter Tr obtained on the basis of each patch image 1 is specified.

Additionally, each specified transmittance parameter Tr is corrected as indicated by the sign 9X in FIG. 9. More specifically, as described above, in the case of specifying the average values for which the magnitude of the value is in the top 10%, each specified transmittance parameter Tr is corrected to be smaller.

Additionally, for example, the average values for which the magnitude of the value is in the bottom 10% of the multiple obtained average values (the average values of the formation sheet parameter Tz) are specified. In other words, the average values satisfying a specific condition are specified from among the multiple obtained average values are also obtained in this case.

Additionally, the patch images 1 corresponding to the formation regions where the specified average values are obtained are specified.

Next, the transmittance parameter Tr obtained on the basis of each specified patch image 1 is specified. In other words, the transmittance parameter Tr corresponding to each patch image 1 is specified from among the information registered in the first conversion table 81 illustrated in FIG. 9.

Additionally, each specified transmittance is corrected. More specifically, as described above, in the case of specifying the average values for which the magnitude of the value is in the bottom 10%, each specified transmittance parameter Tr is corrected to be larger.

As an example, assume a case where a depressed portion exists in part of the formation sheet 98, and all of a patch image 2 formed on the basis of a certain single patch image 1 is contained in the depressed portion.

In this case, the transmittance parameter Tr obtained for the single patch image 1 will be set relatively larger than the other transmittance parameters Tr.

In contrast, if the process of the exemplary embodiment is performed, the transmittance parameter Tr will be corrected to be smaller.

As another example, assume a case where a raised portion exists in part of the formation sheet 98, and all of a patch image 2 formed on the basis of a certain single patch image 1 is positioned in the raised portion.

In this case, the transmittance parameter Tr obtained for the single patch image 1 will be set relatively smaller than the other transmittance parameters Tr.

In contrast, if the process of the exemplary embodiment is performed, the transmittance parameter Tr will be corrected to be larger.

Here, in the exemplary embodiment, a single transmittance parameter Tr obtained in correspondence with a single patch image 1 is the average value of multiple obtained transmittance parameters Tr.

In this case, if the area of a depressed portion is sufficiently smaller than the area of a patch image 2, or if the area of a raised portion is sufficiently smaller than the area of a patch image 2, the transmittance parameter Tr will not be excessively large or excessively small.

In contrast, if the area of a depressed portion or a raised portion is large compared to the area of the patch image 2, the transmittance parameter Tr will be influenced by the depressed or raised portion and be larger or smaller than the other transmittance parameters Tr corresponding to the other patch images 2.

In contrast, in the process described above, the transmittance parameter Tr that has a possibility of being greatly influenced by the shape of the formation sheet 98 is corrected to a transmittance parameter Tr that is less influenced by the shape of the formation sheet 98.

In other words, in this process example, in the case where a region where a patch image 2 is formed on the patch formation sheet 92 is a region satisfying a predetermined condition, the transmittance parameter Tr acquired on the basis of the region where the patch image 2 is formed is modified.

In this process example, each region where each patch image 2 is formed on the patch formation sheet 92 corresponds to a specific region. Additionally, in the case where the specific region satisfies a predetermined condition, the transmittance parameter Tr acquired on the basis of the specific region is modified.

More specifically, in the exemplary embodiment, the transmittance parameter Tr is acquired for each region where each patch image 2 is formed on the patch formation sheet 92, but for a region that satisfies a specific predetermined condition among the regions, the transmittance parameter Tr obtained for the region is modified.

More specifically, in this process example, in the case where a raised portion or a depressed portion having a large area is formed in a first region where a patch image 2 is formed, and the thickness (average thickness) of the patch formation sheet 92 in the first region is larger or smaller than the thickness (average thickness) of other regions, the transmittance parameter Tr acquired on the basis of the first region is modified.

More specifically, in this process example, in the case where the thickness of the patch formation sheet 92 in the first region is greater than the thickness of other regions of the patch formation sheet 92, the transmittance parameter Tr is modified to increase the light transmittance specified by the transmittance parameter Tr acquired on the basis of the first region.

Also, in this process example, in the case where the thickness of the patch formation sheet 92 in the first region is less than the thickness of other regions of the patch formation sheet 92, the transmittance parameter Tr is modified to decrease the light transmittance specified by the transmittance parameter Tr acquired on the basis of the first region.

FIG. 11 is a diagram illustrating another example of the first conversion table 81.

In the first conversion table 81 illustrated in FIG. 11, like the description above, first color information in the CMYK-Spot color space, second color information in the RGB color space, and the transmittance parameter Tr are associated with each other.

Also, in the first conversion table 81, pixel position information expressing the position of a pixel is registered with respect to each of the first color information in the CMYK-Spot color space, the second color information in the RGB color space, and the transmittance parameter Tr.

In the case of using this first conversion table 81 to convert a simulation image, first, the information processing device 110 acquires position information and color information for each of the pixels forming the simulation image.

In other words, in the case where a simulation image is input and input simulation image data is acquired, position information and color information are acquired for each of the pixels forming the simulation image.

Here, coordinate information for each pixel is acquired as the position information, for example, while color information in the CMYK-Spot color space is acquired like the description above as the color information.

Additionally, in this case, the information processing device 110 specifies the row containing both the acquired position information and the acquired color information on the same row from the first conversion table 81.

Thereafter, the information processing device 110 ascertains the second color information in the RGB color space and the transmittance parameter Tr included on the specified row.

In other words, the information processing device 110 ascertains pixel position information matching the position information of a constituent pixel forming the input image data from among the information registered in the first conversion table 81.

Additionally, the information processing device 110 ascertains the first color information having a predetermined relationship with the color information of the constituent pixel from among the information registered in the first conversion table 81.

Furthermore, the information processing device 110 acquires the second color information in the RGB color space and the transmittance parameter Tr associated with both the ascertained pixel position information and the first color information.

Thereafter, the information processing device 110 causes each pixel to be displayed like the description above on the basis of the acquired second color information in the RGB color space, the transmittance parameter Tr, and the background RGB value.

More specifically, for example, in the case where the position information (0000, 0002) and the color information ((C, M, Y, K, spot color)=(0, 20, 0, 0, 80)) are acquired as information about a constituent pixel forming the simulation image (input image), the information processing device 110 specifies the row indicated by the sign 11A in FIG. 11.

On this row, (R, G, B)=(185, 151, 95) is registered as the second color information in the RGB color space, and 0.7 is registered as the transmittance parameter Tr.

In this case, the information processing device 110 acquires (R, G, B)=(185, 151, 95) and 0.7 as the second color information in the RGB color space and the transmittance parameter Tr.

Thereafter, the information processing device 110 causes the target pixel to be displayed like the description above on the basis of the acquired second color information (R, G, B)=(185, 151, 95), the transmittance parameter Tr (0.7), and the background RGB value.

Figure 12:
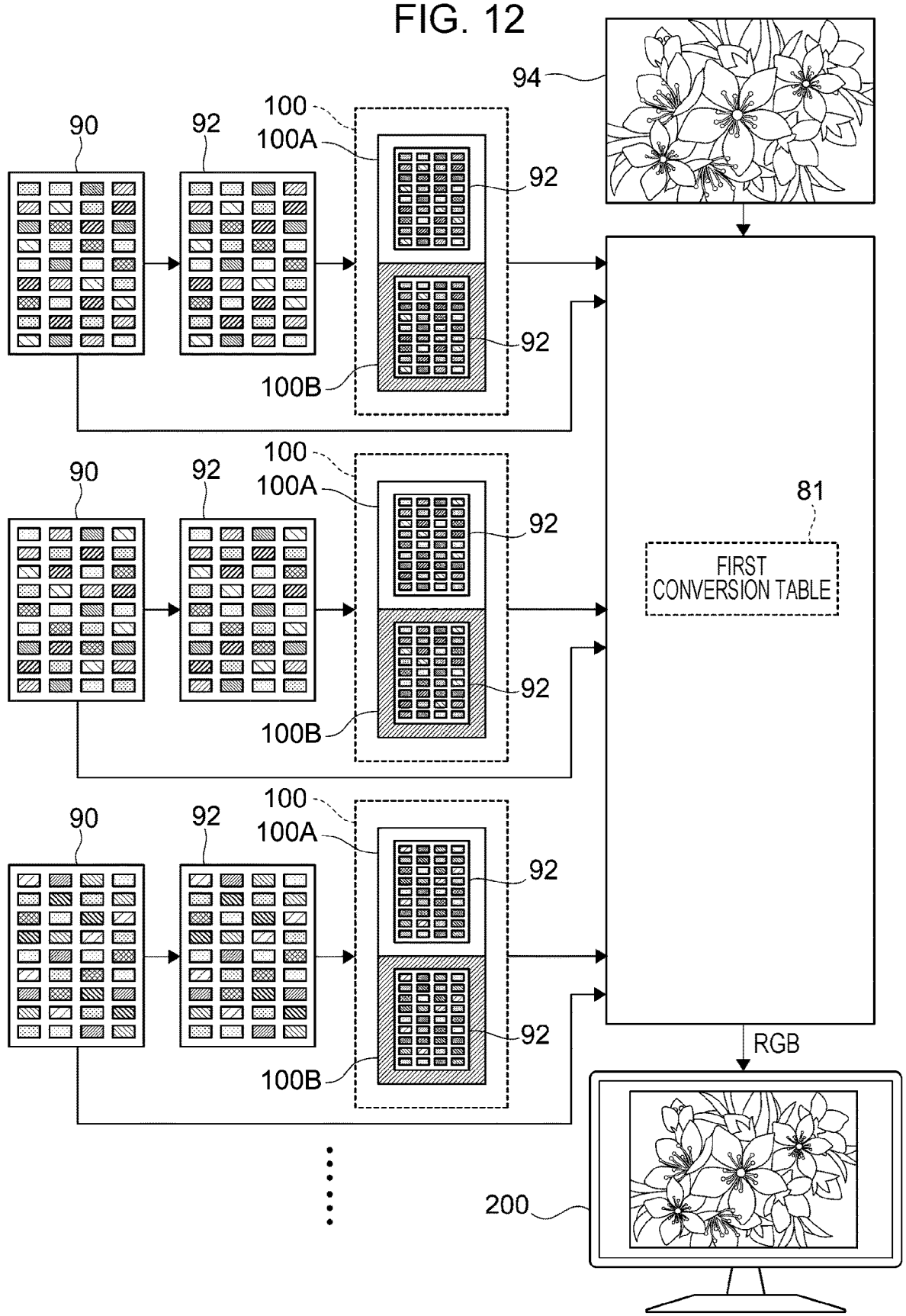
FIG. 12 is a diagram for explaining a method of generating the first conversion table.

FIG. 12 is a diagram for explaining a method of generating the first conversion table 81 illustrated in FIG. 11.

To generate the first conversion table 81 illustrated in FIG. 11, multiple types of original image data 90 having mutually different arrangements of the patch images 1 for each color are prepared.

Additionally, printing onto formation sheets 98 is performed on the basis of the multiple types of original image data 90, and multiple types of patch formation sheets 92 having mutually different arrangements of the patch images 2 for each color are generated.

Furthermore, for each piece of original image data 90, pixel position information expressing position information about the constituent pixels forming the original image data 90 is acquired. Also, for each piece of original image data 90, color information about the constituent pixels forming the original image data 90 is acquired as the first color information.

In addition, for each patch formation sheet 92, second color information (color information in the RGB color space) is acquired for each of the pixels included on each patch formation sheet 92.

In other words, for each patch formation sheet 92, second color information is acquired for the formed pixels, that is, the pixels formed on each patch formation sheet 92 on the basis of the first color information.

Also, for each patch formation sheet 92, the transmittance parameter Tr is acquired for each of the pixels included on each patch formation sheet 92.

In other words, for each patch formation sheet 92, the transmittance parameter Tr is acquired for the locations where the formed pixels formed on each patch formation sheet 92 on the basis of the first color information are positioned.

Additionally, in the exemplary embodiment, the pixel position information, the first color information, the second color information, and the transmittance parameter Tr acquired for each pixel are associated with each other.

Here, the first color information, or in other words the color information in the CMYK-Spot color space, is color information for each pixel included in the original image data 90.

Also, the second color information, or in other words the color information in the RGB color space, is obtained by scanning the patch formation sheet 92 with the scanner device 100 with the white background plate 100A underneath, like the description above.

Also, the transmittance parameter Tr is obtained by scanning the patch formation sheet 92 under conditions with the white background plate 100A installed and under conditions with the black background plate 100B installed, like the description above.

In other words, in this process example, pixel position information expressing position information about each pixel, the first color information expressing color information about the original image data 90, and the RGB value (second color information) as well as the transmittance parameter Tr obtained by scanning the patch formation sheet 92 with the scanner device 100 are obtained for each pixel forming the original image data 90.

Thereafter, the above information obtained for each of the pixels forming the original image data 90 is registered in the first conversion table 81.

With this arrangement, the first conversion table 81 illustrated in FIG. 11 is generated.

In the case of using the first conversion table 81 illustrated in FIG. 1, the RGB value (second color information) and the transmittance parameter Tr of each pixel are acquired with consideration for only the color information of each pixel forming the simulation image.

In contrast, in the case of using the first conversion table 81 illustrated in FIG. 11, the RGB value (second color information) and the transmittance parameter Tr of each pixel are acquired with consideration for the color information and the position information of each pixel forming the simulation image.

Figure 13:
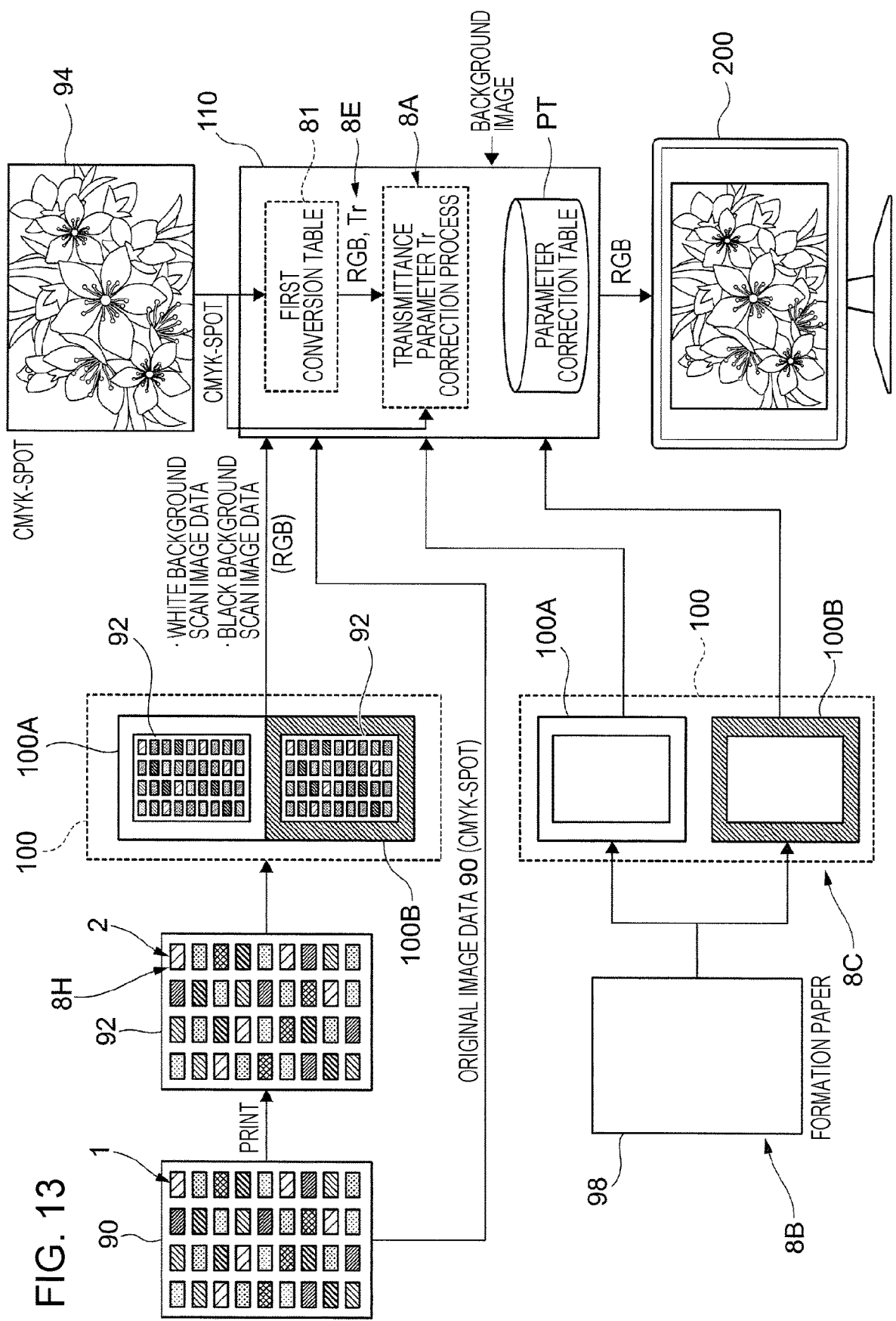
FIG. 13 is a diagram illustrating another process example.

FIG. 13 is a diagram illustrating another process example.

In the process example illustrated in FIG. 13, the process is similar to the process illustrated in FIG. 8 up to a point. More specifically, the process is similar to the process illustrated in FIG. 8 up to the process of acquiring the transmittance parameter Tr. In this process example, the process of correcting the transmittance parameter Tr is difference from the process illustrated in FIG. 8.

In the process illustrated in FIG. 13, like the process illustrated in FIG. 8, first, the formation sheet 98 is prepared as indicated by the sign 8B.

The formation sheet 98 may be a sheet on which the patch images 2 are actually formed later as indicated by the sign 8H in FIG. 13, or a sheet of the same type as the sheet on which the patch images 2 are actually formed as indicated by the sign 8H. The formation sheet 98 may also be a sheet having the same serial number as the sheet on which the patch images 2 are actually formed as indicated by the sign 8H.

It is not necessary to form the patch images 2 on the formation sheet 98 itself. It is sufficient for the sheet on which the patch images 2 are formed and the formation sheet 98 to be sheets of the same type or sheets having the same serial number. The sheet on which the patch images 2 are formed may be a different sheet than the formation sheet 98.

The formation sheet 98 is a sheet on which to simulate the formation of an image based on the simulation image data 94. Moreover, the following description illustrates the process for the case of executing a simulation of the formation of an image on the formation sheet 98 based on the simulation image data 94.

In this process example, the formation sheet 98 is scanned by the scanner device 100, as indicated by the sign 8C in FIG. 13.

Specifically, the formation sheet 98 is scanned under conditions with the white background plate 100A installed and under conditions with the black background plate 100B installed, and two pieces of scan image data are generated.

Next, like the description above, the two pieces of scan image data are used to obtain a transmittance parameter (hereinafter referred to as the "transmittance parameter Tp") for each pixel. In other words, the transmittance parameter Tp is obtained for each pixel according to a process similar to the process illustrated in FIG. 4.

In other words, in this process example, medium light transmittance information, that is, information expressing the degree of light transmittance by the formation sheet 98, is obtained too.

In other words, in this process example, the transmittance parameter Tp is acquired for each pixel of the formation sheet 98 as information about the formation sheet 98 on which to simulate the formation of an image based on the simulation image data 94.

In other words, in this process example, information related to the roughness (that is, depressed and raised portions) of the formation sheet 98 is acquired too. Here, the transmittance parameter Tp is influenced by the roughness of the formation sheet 98, and in this process example, the transmittance parameter Tp is acquired as information related to the roughness of the formation sheet 98.

Additionally, in this process example, the transmittance parameter Tp obtained for each pixel and position information about each pixel are registered in association with each other in a parameter correction table PT (see FIG. 13) stored in the information processing device 110. Note that in this specification, the "transmittance parameter Tp" is hereinafter referred to as the "correction parameter Tp".

When the simulation image data 94 is input into the information processing device 110, like the description above, the information processing device 110 uses the first conversion table 81 to obtain the RGB value and the transmittance parameter Tr for each pixel included in the simulation image data 94, as indicated by the sign 8E in FIG. 13.

More specifically, in the case of acquiring the simulation image data 94 given as one example of input image data, like the description above, the information processing device 110 first ascertains, for each pixel of the simulation image data 94, the first color information having a predetermined relationship with the color information of a pixel included in the simulation image data 94.

Furthermore, like the description above, the information processing device 110 acquires the second color information and the transmittance parameter Tr associated with the ascertained first color information.

Furthermore, when the simulation image data 94 is input, the information processing device 110 acquires, for each of the pixels included in the simulation image data 94, position information indicating where each pixel is positioned on the basis of information included in the simulation image data 94.

In other words, in this process example, when the simulation image data 94 is input, the information processing device 110 acquires the RGB value, the transmittance parameter Tr, and the position information as information about each pixel.

Next, the information processing device 110 performs a process of correcting the transmittance parameter Tr acquired for each pixel. In other words, a process of correcting the transmittance parameter Tr obtained by using the first conversion table 81 is performed.

More specifically, the information processing device 110 performs a process of correcting (modifying) the transmittance parameter Tr given as an example of light transmittance information on the basis of the correction parameter Tp and the simulation image data 94 given as an example of input image data.

Specifically, the information processing device 110 uses the correction parameter Tp registered in the parameter correction table PT and the color information of each pixel forming the simulation image data 94 to perform the process of correcting the transmittance parameter Tr for each of the pixels forming the simulation image data 94.

Specifically, the information processing device 110 uses the function indicated by Expression (1) below to obtain a corrected transmittance parameter Tr'.

$$Tr'=F(Tr,Tp,\text{total coverage of }CMYK\text{-Spot}) \tag{1}$$

Here, Tr is the pre-correction transmittance parameter Tr, or in other words, the transmittance parameter Tr obtained by referencing the first conversion table 81.

Also, Tp is the correction parameter Tp.

The total coverage of CMYK-Spot is the sum total of the amount of toner used for each color in CMYK-Spot. In other words, the total coverage of CMYK-Spot is information (quantity information) about the quantity of material used when forming an image on the basis of the simulation image data 94.

In the exemplary embodiment, the information processing device 110 acquires the transmittance parameter Tr as described above for a single pixel forming the simulation image data 94, for example.

Additionally, the information processing device 110 acquires the correction parameter Tp for the single pixel. Specifically, the information processing device 110 acquires the correction parameter Tp registered in the parameter correction table PT in association with the location where the single pixel is positioned.

The information processing device 110 also acquires the total coverage for the single pixel. In other words, the information processing device 110 acquires information about the amount of toner used to form the single pixel.

Thereafter, the information processing device 110 substitutes the acquired information into Expression (1) to obtain the corrected transmittance parameter Tr'.

Here, the function F indicated in Expression (1) above is a function in which the degree of influence by the correction parameter Tp on the pre-correction transmittance parameter Tr decreases as the value of the total coverage increases.

Specifically, the function F is a function in which the degree of correction of the transmittance parameter Tr decreases when the value of the total coverage is large, even in cases where there is a large difference between the uncorrected transmittance parameter Tr and the correction parameter Tp and the degree of correction of the pre-correction transmittance parameter Tr would be increased normally.

Conversely, the function F is a function in which the degree of correction of the pre-correction transmittance parameter Tr increases when the value of the total coverage is small.

Here, in the case where the difference between the pre-correction transmittance parameter Tr and the correction parameter Tp is large, the formation sheet 98 is anticipated to have portions that are partially thick or portions that are partially thin, for example, and in this case, correcting the transmittance parameter Tr is preferable.

On the other hand, for the portions where plenty of toner is applied, the influence of the underlying formation sheet 98 is decreased, and if the transmittance parameter Tr is corrected excessively, the result of the simulation based on the simulation image data 94 conversely may look unnatural.

Consequently, in this process example, the transmittance parameter Tr is corrected on the basis of the correction parameter Tp, but the degree of the correction is decreased in cases where the total coverage is large. Also, conversely, the degree of the correction is increased in cases where the total coverage is small.

In other words, in cases where the total coverage is large, the degree of influence by the correction parameter Tp on the correction of the transmittance parameter Tr is decreased, whereas in cases where the total coverage is small, the degree of influence by the correction parameter Tp on the correction of the transmittance parameter Tr is increased.

In other words, in the exemplary embodiment, the degree of modification of the transmittance parameter Tr decreases as the value specified by the quantity information above increases.

Like the description above, the transmittance parameter Tr (pre-correction transmittance parameter Tr) obtained in the exemplary embodiment is an average value of multiple obtained transmittance parameters Tr, and may also be considered to be the transmittance parameter Tr in the case of assuming a sheet of uniform roughness.

In contrast, in this process example, the formation sheet 98 to be simulated is actually prepared, and information about the roughness (depressed and raised portions) of the formation sheet 98 is obtained.

Additionally, the correction parameter Tp is used to correct the transmittance parameter Tr corresponding to locations where the sheet is locally thicker and locations where the sheet is locally thinner.

At this time, in this process example, the amount of toner applied to the locations where the sheet is locally thicker and the locations where the sheet is locally thinner is considered, and the degree to which the correction parameter Tp affects the transmittance parameter Tr is determined on the basis of the amount of toner.

Thereafter, the correction parameter Tp is made to affect the transmittance parameter Tr on the basis of the determined degree, and the corrected transmittance parameter Tr' is obtained.

The above will be described by citing a specific example.

In the exemplary embodiment, the maximum amount of the total coverage of CMYK-Spot is 500%. More specifically, the maximum value of the coverage for each color is 100%, and the maximum value of the total coverage of CMYK-Spot is 500%.

Here, the coverage for each of C, M, Y, K, and the spot color is assumed to be (100, 100, 100, 100, 0), for example. In this case, the total coverage of CMYK-Spot is 400%, and in addition, the color of a pixel formed on the basis of the color information (100, 100, 100, 100, 0) is black.

In the exemplary embodiment in this case, the degree to which the correction parameter Tp affects the transmittance parameter Tr is decreased.

Specifically, the degree to which the correction parameter Tp affects the transmittance parameter Tr is set to zero, for example. In this case, when simulating a pixel formed on the basis of the color information (100, 100, 100, 100, 0), the initial transmittance parameter Tr itself is used.

For a pixel having the color information (100, 100, 100, 100, 0), the transmittance parameter Tr obtained by referencing the first conversion table 81 illustrated in FIG. 3 is decreased.

In this case, if the degree to which the correction parameter Tp affects the transmittance parameter Tr is increased, for example, the transmittance parameter Tr increases and the display may look unnatural.

In contrast, in the exemplary embodiment, the small degree of transmittance is maintained for locations where plenty of toner is applied and the degree of transmittance is small to begin with as above.

Note that when determining the degree to which the correction parameter Tp affects the transmittance parameter Tr, the degree may be set to zero in the case where the total coverage exceeds a predetermined value less than 500% above (such as 100%, for example).

In other words, the degree may also be set to zero in the case where the total coverage exceeds a specific value that is smaller than the maximum value (500%) of the total coverage.

In other words, rather than having the degree go to zero in the case where the total coverage reaches the maximum value of the total coverage, the degree may also go to zero in the case where the total coverage is less than the maximum value.

Otherwise, not only the total coverage but also the lightness of CMYK-Spot may be considered to determine the degree to which the correction parameter Tp affects the transmittance parameter Tr.

In other words, the degree to which the correction parameter Tp affects the transmittance parameter Tr may be determined on the basis of the total coverage of CMYK-Spot as well as the lightness of CMYK-Spot.

Specifically, the degree to which the correction parameter Tp affects the transmittance parameter Tr may be increased as the lightness of CMYK-Spot increases, and decreased as the lightness of CMYK-Spot decreases.

In other words, the degree to which the transmittance parameter Tr given as an example of light transmittance information is modified may be decreased as the lightness specified by acquired information about the lightness decreases.

Here, the coverage for each of C, M, Y, K, and the spot color is assumed to be (0, 0, 100 (yellow), 0, 0), for example. In this instance, the degree may be set to zero as above in some cases when determining the degree to which the correction parameter Tp affects the transmittance parameter Tr on the basis of only the total coverage of CMYK-Spot.

More specifically, in the case where the degree is configured to be set to zero when the total coverage exceeds a predetermined value that is smaller than 500% (such as 100%, for example) as above, the degree goes to zero if the coverage for each of C, M, Y, K, and the spot color is (0, 0, 100, 0, 0).

However, in actuality, the case where the coverage for each of C, M, Y, K, and the spot color is (0, 0, 100, 0, 0) results in a state in which a yellow pixel (a pixel that easily appears translucent or sheer) is formed, and the influence of the formation sheet 98 will appear when the simulation image data 94 is displayed.

In such cases, if the lightness is also considered to determine the degree, a corrected transmittance parameter Tr' in which the influence of the formation sheet 98 is represented is obtained.

More specifically, a corrected transmittance parameter Tr' having a value that exceeds 0 is obtained.

Note that information about the lightness may be obtained by pre-generating a table in which the relationship between the color information and the lightness of the simulation image data 94 is registered. More specifically, by referencing the table, the lightness corresponding to the color information of the simulation image data 94 is obtained.

Thereafter, in the exemplary embodiment, the degree to which the correction parameter Tp affects the transmittance parameter Tr is determined on the basis of the obtained lightness. Additionally, the correction parameter Tp is made to affect the transmittance parameter Tr to the determined degree, and ultimately the corrected transmittance parameter Tr' is obtained.

In this way, in the exemplary embodiment, information about the lightness of an image formed on the basis of the simulation image data 94 is acquired on the basis of the simulation image data 94 treated as the input image data.

Additionally, the acquired transmittance parameter Tr is modified on the basis of the acquired information about the lightness, and a new transmittance parameter Tr' is obtained.

Otherwise, the degree to which the correction parameter Tp affects the transmittance parameter Tr may also be determined on the basis of only the lightness of CMYK-Spot, without considering the total coverage of CMYK-Spot. In other words, the degree to which the correction parameter Tp affects the transmittance parameter Tr may also be determined on the basis of only the lightness obtained on the basis of the color information of the simulation image data 94.

In this case as well, the degree to which the correction parameter Tp affects the transmittance parameter Tr is increased as the lightness of CMYK-Spot increases, and decreased as the lightness of CMYK-Spot decreases.

Figure 14:
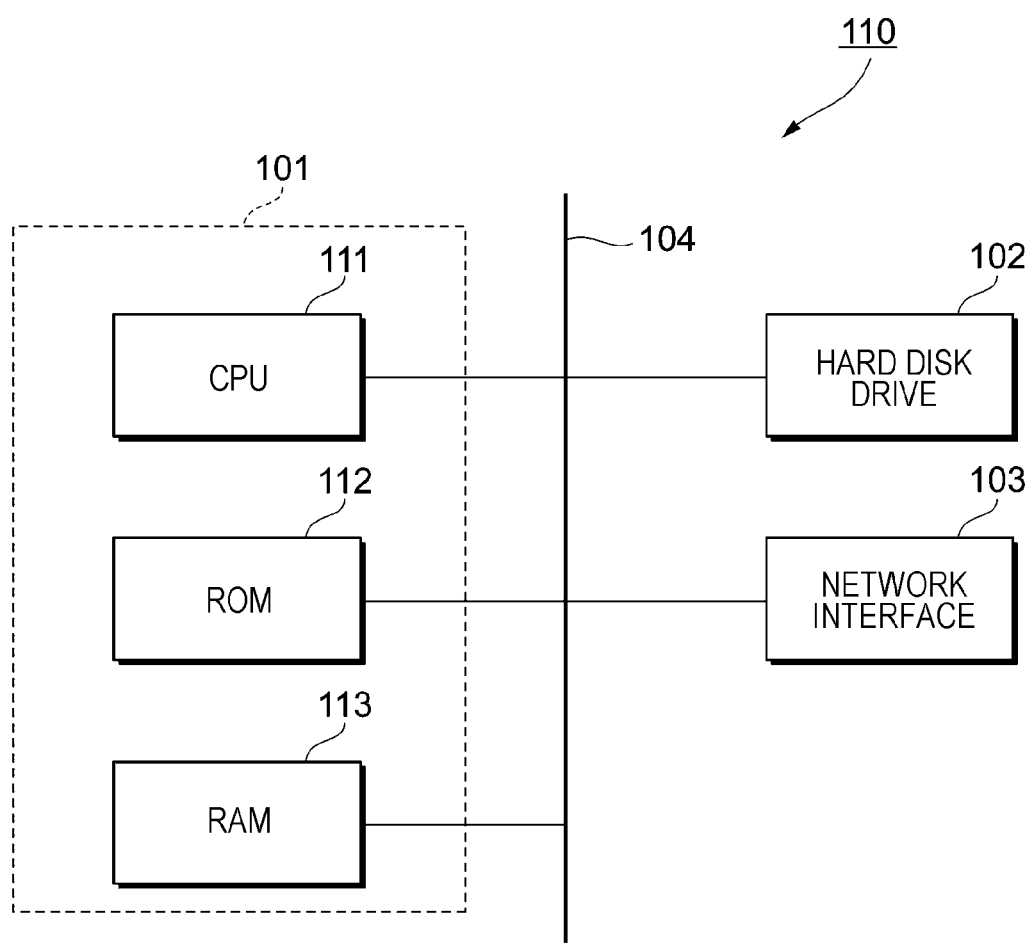
FIG. 14 is a diagram illustrating an example of a hardware configuration of an information processing device.

FIG. 14 is a diagram for explaining an example of a hardware configuration of the information processing device 110.

The information processing device 110 includes a control unit 101 that controls the operations of the device overall, a hard disk drive 102 that stores information such as the first conversion table 81 above, and a network interface 103 that achieves communication through a local area network (LAN) cable or the like.

The control unit 101 includes a central processing unit (CPU) 111 as one example of a processor, read-only memory (ROM) 112 storing data such as low-level software and a basic input-output system (BIOS), and random access memory (RAM) 113 that is used as a work area.

The CPU 111 may also be multi-core. Additionally, the ROM 112 may be rewritable non-volatile semiconductor memory. The control unit 101 may also be referred to as a computer.

In the exemplary embodiment, the processes described above are executed by causing the CPU 111 to execute a program stored in the ROM 112 or the like.

The hard disk drive 102 is a device that reads and writes data with respect to a non-volatile storage medium in which the surface of a disk-shaped substrate is coated with a magnetic substance. Obviously, the non-volatile storage medium may also be semiconductor memory or magnetic tape.

Besides the above, the information processing device 110 is also provided with an input device such as a keyboard or mouse and a display device such as a liquid crystal display as appropriate.

The control unit 101, the hard disk drive 102, and the network interface 103 are connected by a bus 104 and through signal lines not illustrated.

Here, a program executed by the CPU 111 may be provided to the information processing device 110 in a recorded state on a computer-readable recording medium, such as a magnetic recording medium (such as magnetic tape or a magnetic disk), an optical recording medium (such as an optical disc), a magneto-optical recording medium, or semiconductor memory.

Additionally, a program executed by the CPU 111 may also be provided to the information processing device 110 using a communication medium such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor configured to
acquire image data including color information,
acquire color information of a formed image, the formed image being an image formed on a recording medium on a basis of the image data,
acquire light transmittance information expressing a degree of light transmittance of an image-carrying medium, the image-carrying medium being the recording medium on which the formed image is formed, and
associate first color information, second color information, and the light transmittance information with each other, the first color information being the color information included in the image data and the second color information being the color information of the formed image, wherein the processor is configured to further acquire medium information about a formation medium, the formation medium being the recording medium on which the formed image is to be formed, in a case where image data is input and acquired as input image data, ascertain the first color information having a predetermined relationship with color information of the input image data, and acquire the second color information and the light transmittance information associated with the ascertained first color information, and also modify the acquired light transmittance information on a basis of the medium information.

2. The information processing device according to claim 1, wherein the processor is configured to acquire color information of pixels forming the image data as the first color information, acquire color information of formed pixels as the second color information, the formed pixels being pixels formed on the image-carrying medium on a basis of the first color information, acquire information about a degree of light transmittance at locations where the formed pixels are formed on the image-carrying medium as the light transmittance information, and associate the first color information, the second color information, and the light transmittance information acquired for each pixel.

3. The information processing device according to claim 1, wherein the processor is configured to acquire the light transmittance information on a basis of a first scan result obtained by scanning the formed image while a first background is installed behind the image-carrying medium and a second scan result obtained by scanning the formed image while a second background different from the first background is installed behind the image-carrying medium.

4. The information processing device according to claim 3, wherein the processor is configured to acquire the light transmittance information on a basis of the first scan result obtained by scanning the formed image while the first background is installed and the second scan result obtained by scanning the formed image while the second background having a different lightness from the first background is installed.

5. The information processing device according to claim 1, wherein the processor is configured to acquire device-independent color information as the second color information expressing color information of the formed image formed on the image-carrying medium, and associate the first color information included in the image data, the device-independent second color information, and the light transmittance information.

6. The information processing device according to claim 5, wherein the processor is configured to acquire a scan result obtained by using a colorimeter to read a color of the formed image formed on the image-carrying medium on a basis of the image data as the device-independent second color information.

7. The information processing device according to claim 5, wherein the processor is configured to convert device-dependent color information expressing a scan result obtained by using a scanner device to read the formed image formed on the image-carving medium on a basis of the image data to device-independent color information, and acquire the device-independent color information obtained by the conversion as the device-independent second color information.

8. The information processing device according to claim 1, wherein the processor is configured to further acquire medium light transmittance information expressing a degree of light transmittance of the formation medium, and modify the light transmittance information on a basis of the medium light transmittance information.

9. The information processing device according to claim 1, wherein the processor is configured to acquire information related to depressed and raised portions of the formation medium as the medium information, for each pixel of the input image data, ascertain the first color information having a predetermined relationship with the color information of the pixel, and also acquire the second color information and the light transmittance information associated with the ascertained first color information, specify a pixel of the input image data that would be positioned in a depressed portion or a raised portion of the formation medium in a case of assuming that an image based on the input image data is formed on the formation medium, and modify the light transmittance information acquired for the pixel that would be positioned in the depressed portion or the raised portion.

10. The information processing device according to claim 9, wherein the processor is configured to modify the light transmittance information to increase a light transmittance specified by the light transmittance information acquired for the pixel that would be positioned in the depressed portion, and modify the light transmittance information to decrease a light transmittance specified by the light transmittance information acquired for the pixel that would be positioned in the raised portion.

11. The information processing device according to claim 1, wherein the processor is configured to acquire information about a degree of light transmittance in a specific region of the image-carrying medium as the light transmittance information, and in a case where the specific region is a region satisfying a predetermined condition, modify the light transmittance information acquired on a basis of the specific region.

12. The information processing device according to claim 11, wherein the processor is configured to modify the light transmittance information acquired on a basis of the specific region in a case where a thickness of the image-carrying medium in the specific region is thicker or thinner than other regions of the image-carrying medium.

13. The information processing device according to claim 12, wherein
the processor is configured to
modify the light transmittance information to increase the light transmittance specified by the light transmittance information acquired on a basis of the specific region in a case where the thickness of the image-carrying medium in the specific region is thicker than other regions of the image-carrying medium, and
modify the light transmittance information to decrease the light transmittance specified by the light transmittance information acquired on a basis of the specific region in a case where the thickness of the image-carrying medium in the specific region is thinner than other regions of the image-carrying medium.

14. The information processing device according to claim 1, wherein
the processor is configured to
acquire pixel position information expressing position information of pixels forming the image data,
acquire color information of pixels forming the image data as the first color information,
acquire color information of formed pixels as the second color information, the formed pixels being pixels formed on the image-carrying medium on a basis of the first color information,
acquire information about a degree of light transmittance at locations where the formed pixels are formed on the image-carrying medium as the light transmittance information, and
associate the pixel position information, the first color information, the second color information, and the light transmittance information acquired for each pixel.

15. The information processing device according to claim 14, wherein
the processor is configured to
in a case where image data is input and acquired as input image data, ascertain the pixel position information that matches position information of a constituent pixel forming the input image data, and also ascertain the first color information having a predetermined relationship with color information of the constituent pixel, and
acquire the second color information and the light transmittance information associated with both of the ascertained pixel position information and the ascertained first color information.

16. The information processing device according to claim 1, wherein
the processor is configured to
modify the acquired light transmittance information on a basis of the input image data.

17. The information processing device according to claim 1, wherein
the processor is further configured to
converts color information of the input image data to color information in another color space different from a color space of the color information of the input image data, and
acquire the light transmittance information expressing a degree of light transmittance associated with the color information of the other color space.

18. A non-transitory computer readable medium storing a program causing a computer to execute a process for processing information, the process comprising:
acquiring image data including color information;
acquiring color information of a formed image, the formed image being an image formed on a recording medium on a basis of the image data;
acquiring light transmittance information expressing a degree of light transmittance of an image-carrying medium, the image-carrying medium being the recording medium on which the formed image is formed; and
associating first color information, second color information, and the light transmittance information with each other, the first color information being the color information included in the image data and the second color information being the color information of the formed image, wherein
the process further comprises:
acquiring medium information about a formation medium, the formation medium being the recording medium on which the formed image is to be formed,
in a case where image data is input and acquired as input image data, ascertaining the first color information having a predetermined relationship with color information of the input image data, and
acquiring the second color information and the light transmittance information associated with the ascertained first color information, and also modifying the acquired light transmittance information on a basis of the medium information.

* * * * *